US010844902B2

(12) United States Patent
Nambu et al.

(10) Patent No.: US 10,844,902 B2
(45) Date of Patent: Nov. 24, 2020

(54) TURBOCHARGER

(71) Applicant: MITSUBISHI HEAVY INDUSTRIES ENGINE & TURBOCHARGER, LTD., Sagamihara (JP)

(72) Inventors: Takashi Nambu, Tokyo (JP); Hiroshi Suzuki, Tokyo (JP); Takashi Shiraishi, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 251 days.

(21) Appl. No.: 15/548,524

(22) PCT Filed: Feb. 9, 2015

(86) PCT No.: PCT/JP2015/053529
§ 371 (c)(1),
(2) Date: Aug. 3, 2017

(87) PCT Pub. No.: WO2016/129039
PCT Pub. Date: Aug. 18, 2016

(65) Prior Publication Data
US 2018/0238383 A1    Aug. 23, 2018

(51) Int. Cl.
*F16C 17/04* (2006.01)
*F02B 39/00* (2006.01)
(Continued)

(52) U.S. Cl.
CPC .............. *F16C 17/045* (2013.01); *F01D 9/02* (2013.01); *F02B 39/00* (2013.01); *F16C 35/02* (2013.01);
(Continued)

(58) Field of Classification Search
CPC ........ F16C 17/045; F16C 17/04; F16C 35/02; F16C 2360/24; F16C 35/0651;
(Continued)

(56) References Cited

U.S. PATENT DOCUMENTS 4,279,576 A  *  7/1981  Okano .................... F02B 37/00
                                                           324/173
4,480,440 A  *  11/1984  Harper ................... F02B 39/14
                                                           417/407
(Continued)

FOREIGN PATENT DOCUMENTS

CN       103670672 A    3/2014
DE       3430 146 A1    3/1985
(Continued)

OTHER PUBLICATIONS

Office Action dated Nov. 19, 2018 in corresponding Chinese Application No. 201580075385.0.
(Continued)

*Primary Examiner* — Jesse S Bogue
(74) *Attorney, Agent, or Firm* — Birch, Stewart, Kolasch & Birch, LLP

(57) ABSTRACT

A turbocharger according to one embodiment of this invention includes: a rotation shaft; a compressor impeller; a compressor housing; a bearing housing connected to the compressor housing and configured to define a diffuser flow path between the bearing housing and the compressor housing; a thrust plate configured to support the rotation shaft in an axial direction; an insert component configured to retain the thrust plate between the insert component and a protruding wall portion in the bearing housing; a snap ring configured to be inserted in a first circumferential groove formed in an inner peripheral wall surface of the bearing housing, to thereby fix the insert component in a state in which the insert component is pressed against the thrust (Continued)

plate; and a diffuser component having a diffuser surface extending along a direction orthogonal to an axis of the rotation shaft between the inner peripheral wall surface of an end portion of the bearing housing on one side thereof and an outer peripheral edge of the compressor impeller.

17 Claims, 21 Drawing Sheets

(51) Int. Cl.
    *F01D 9/02*     (2006.01)
    *F16C 35/02*     (2006.01)
    *F16J 15/34*     (2006.01)

(52) U.S. Cl.
    CPC ....... *F16J 15/3452* (2013.01); *F05D 2220/40* (2013.01); *F05D 2240/52* (2013.01); *F16C 17/04* (2013.01); *F16C 2360/24* (2013.01)

(58) Field of Classification Search
    CPC .............. F16J 15/3452; F05D 2220/40; F05D 2240/52; F04D 29/051; F04D 29/0513
    See application file for complete search history.

(56) References Cited

U.S. PATENT DOCUMENTS

| | | | | |
|---|---|---|---|---|
| 5,246,352 | A * | 9/1993 | Kawakami | F01D 25/164 384/901 |
| 5,857,337 | A * | 1/1999 | Kawasaki | F02B 37/183 60/602 |
| 5,967,762 | A * | 10/1999 | Keller | F01D 25/16 417/407 |
| 10,197,065 | B2 * | 2/2019 | Yano | F04D 29/284 |
| 10,240,610 | B2 * | 3/2019 | Kelly | F01D 25/16 |
| 2005/0079049 | A1 | 4/2005 | Ishihara et al. | |
| 2008/0282676 | A1 * | 11/2008 | Winsor | F01N 3/0253 60/286 |
| 2010/0150709 | A1 | 6/2010 | Roduner et al. | |
| 2011/0189011 | A1 * | 8/2011 | Claus | F04D 29/444 415/213.1 |
| 2012/0269659 | A1 * | 10/2012 | Lischer | F01D 25/24 417/406 |
| 2015/0131931 | A1 * | 5/2015 | Duecker-Schulz | F16C 17/045 384/121 |
| 2016/0003259 | A1 * | 1/2016 | Yonezawa | F02B 39/00 60/605.1 |
| 2016/0084263 | A1 * | 3/2016 | Morita | F02B 39/00 60/598 |
| 2019/0078732 | A1 * | 3/2019 | Kojima | F16C 17/04 |

FOREIGN PATENT DOCUMENTS

| | | | |
|---|---|---|---|
| DE | 197 13 415 A1 | 11/1997 | |
| EP | 2 511 543 A1 | 10/2012 | |
| JP | 58-106521 U | 7/1983 | |
| JP | 60138228 A * | 7/1985 | .......... F01D 25/166 |
| JP | 61-10936 U | 1/1986 | |
| JP | 63-183438 U | 11/1988 | |
| JP | 64-19022 U | 1/1989 | |
| JP | 2002-180841 A | 6/2002 | |
| JP | 2005-113797 A | 4/2005 | |
| JP | 2008-223673 A | 9/2008 | |
| JP | 2013-A37106 * | 6/2013 | ............. F16C 17/02 |
| JP | 2013-185443 A | 9/2013 | |
| JP | 5494248 B2 | 5/2014 | |
| JP | 2014-149058 A | 8/2014 | |
| JP | 5609217 B2 | 9/2014 | |
| WO | WO 2011/152454 A1 | 12/2011 | |
| WO | WO 2015/013114 A1 | 1/2015 | |

OTHER PUBLICATIONS

International Preliminary Report on Patentability and Written Opinion of the International Searching Authority (Forms PCT/IB/326, PCT/IB/338, PCT/IB/373 and PCT/ISA/237) for International Application No. PCT/JP2015/053529, dated Aug. 24, 2017, with an English translation of the Written Opinion.
International Search Report (Form PCT/ISA/210) for International Application No. PCT/JP2015/053529, dated Apr. 28, 2015 with an English translation.
Extended European Search Report dated Jan. 4, 2018 issued to the corresponding EP Application No. 15881914.4.
Office Action dated Jul. 22, 2019 issued in the corresponding Indian Application No. 201717027642.
Office Action dated Apr. 13, 2018 to the corresponding Japanese Application No. 2016-574542.

* cited by examiner (a)

(b)

(a)

(b)

(a)

(b)

(a)

(b)

(a)

(b)

(a)

(b)

(a)

(b)

(a)

(b)

TURBOCHARGER

TECHNICAL FIELD

This disclosure relates to a turbocharger.

BACKGROUND

Hitherto, as a technology of increasing the output of an engine, a method of compressing intake air by a turbocharger and supplying the compressed intake air to the engine (turbocharging) has been known and widely used in engines for automobiles and the like. In general, the turbocharger includes a rotation shaft and a compressor impeller provided on the rotation shaft on one end side thereof. By rotating the rotation shaft at high speed by the exhaust energy of the exhaust gas and the driving force of a motor and the like, the intake air is compressed by the compressor impeller provided on the rotation shaft on one end side thereof.

The intake air compressed by the compressor impeller flows through a diffuser flow path defined between a compressor housing and a bearing housing, thereby being introduced to a scroll flow path formed in the outer peripheral portion of the compressor housing.

In general, the radially outer portion of the compressor impeller is formed to have a size substantially same or larger than that of the radially inner portion of the bearing housing, and a large gap does not exist between the outer peripheral edge of the compressor impeller and the inner peripheral wall surface of the bearing housing. Thus, there has not been a problem in which the intake air compressed by the compressor impeller leaks into the bearing housing through this gap to cause a large pressure loss, thereby decreasing the compression efficiency.

CITATION LIST

Patent Literature

Patent Document 1: JP2002-180841A
Patent Document 2: JP2008-223673A

SUMMARY

Technical Problem

As engines are increasingly downsized in recent years, demands for a compressor impeller that is smaller than the related art are increasing. When a compressor impeller that is smaller than the related art is considered to be employed, there is a problem in that, when components such as a bearing housing, a thrust plate accommodated in the bearing housing, and an insert component configured to fix the thrust plate are used in common for the related-art turbocharger, a large gap is formed between the outer peripheral edge of the compressor impeller and the inner peripheral wall surface of the bearing housing, thereby decreasing the compression efficiency.

When the radially inner portion of the bearing housing is downsized in accordance with the radially outer portion of the small compressor impeller, there is a need to change the shapes of the components such as the thrust plate and the insert component accommodated in the bearing housing, thereby leading to an increase in costs.

When the radially outer portion of the compressor impeller is extended to fill the gap, the moment of inertia of the compressor impeller increases, thereby degrading responsiveness.

In FIG. 1 and the like of Patent Document 1, a technology of preventing the compression efficiency of a turbo compressor from decreasing as follows is disclosed. Specifically, in a turbocharger (turbo compressor 3) in which a seal plate (denoted by 11) is fixed to a bearing housing (bearing housing 7) by a fastening screw (denoted by 21) in a diffuser flow path (diffuser D), an opening end portion of a counterbore (denoted by 20) configured to support the fastening screw is occluded. However, the turbo compressor of Patent Document 1 has a basic structure different from that of the turbocharger according to one embodiment of this invention described later in that the seal plate is fixed to the end portion of the bearing housing by the fastening screw in the turbo compressor of Patent Document 1.

In FIG. 2 and the like of Patent Document 2, a technology of preventing the compression efficiency of a compressor impeller from decreasing as follows is disclosed. Specifically, in a turbocharger (turbocharger) in which a seal plate (denoted by 20) is fixed to a bearing housing (denoted by 3) by a bolt (denoted by 21), an annular component (denoted by 31) facing a diffuser portion (denoted by 27) is provided in order to occlude an opening end portion of a hole portion (denoted by 37) configured to retain the head of the bolt. However, the turbocharger of Patent Document 2 has a basic structure different from that of the turbocharger according to one embodiment of this invention described later in that the seal plate is fixed to the end portion of the bearing housing by the bolt in the turbocharger of Patent Document 2.

According to at least one embodiment of this invention, this invention is provided on the basis of the situation of the related-art the technology as above and has an object to provide a turbocharger capable of enhancing the compression efficiency by filling a gap formed between an outer peripheral edge of a compressor impeller and an inner peripheral wall surface of a bearing housing through a simple structure.

Solution to Problem (1) A turbocharger according to at least one embodiment of this invention includes:
a rotation shaft;
a compressor impeller provided on one end side of the rotation shaft;
a compressor housing configured to accommodate the compressor impeller;
a bearing housing connected, at an end portion on one side thereof, to the compressor housing, the bearing housing being configured to define, between the bearing housing and the compressor housing, a diffuser flow path which extends along a direction orthogonal to an axis of the rotation shaft and through which intake air compressed by the compressor impeller flows, the bearing housing including a protruding wall portion protruding from an inner peripheral wall surface of the bearing housing;
a thrust plate accommodated in the bearing housing and configured to support the rotation shaft in an axial direction;
an insert component accommodated in the bearing housing at a position closer to the end portion of the bearing housing on one side thereof than a position of the thrust plate in the axial direction of the rotation shaft, and configured to retain the thrust plate between the insert component and the protruding wall portion;

a snap ring accommodated in the bearing housing and configured to be inserted in a first circumferential groove formed in the inner peripheral wall surface of the bearing housing, to thereby fix the insert component in a state in which the insert component is pressed against the thrust plate; and a diffuser component accommodated in the bearing housing and having a diffuser surface that defines a part of the diffuser flow path extending along the direction orthogonal to the axis of the rotation shaft between the inner peripheral wall surface of the end portion of the bearing housing on one side thereof and an outer peripheral edge of the compressor impeller.

The turbocharger according to item (1) includes the diffuser component accommodated in the bearing housing. The diffuser component has the diffuser surface extending along the direction orthogonal to the axis of the rotation shaft between the inner peripheral wall surface of the end portion of the bearing housing on one side thereof and the outer peripheral edge of the compressor impeller and configured to define a part of the diffuser flow path. As a result, by filling a gap between the outer peripheral edge of the compressor impeller and the inner peripheral wall surface of the end portion of the bearing housing on one side thereof by the diffuser surface of the diffuser component described above, the intake air flowing through the diffuser flow path can be prevented from flowing into the gap and the compression efficiency of the turbocharger can be enhanced.

Thus, for example, when the compressor impeller is downsized, the bearing housing and the components accommodated in the bearing housing can be used in common for the turbocharger of the related-art.

(2) In several embodiments, in the turbocharger according to item (1), the insert component includes: an inner peripheral portion including an inner peripheral-side wall portion extending along the direction orthogonal to the axis of the rotation shaft; and an outer peripheral portion including an outer peripheral-side wall portion extending along the direction orthogonal to the axis of the rotation shaft at a position farther from the end portion of the bearing housing on one side thereof than a position of the inner peripheral-side wall portion, and a protruding portion protruding from the outer peripheral-side wall portion toward the thrust plate. The snap ring is configured to be positioned on an outer peripheral side of the inner peripheral portion of the insert component and come into abutment with the outer peripheral-side wall portion of the insert component in a state in which the snap ring is inserted in the first circumferential groove. The diffuser component is configured to be positioned on an outer peripheral side of the inner peripheral portion of the insert component.

According to the embodiments described in item (2), in the insert component, the outer peripheral-side wall portion of the outer peripheral portion is at a position farther from the end portion of the bearing housing on one side thereof than a position of the inner peripheral-side wall portion of the inner peripheral portion. As a result, a space is formed between the inner peripheral portion on the outer peripheral side thereof and the inner peripheral wall surface of the bearing housing. Thus, the insert component, the snap ring, and the diffuser component can be compactly placed in the bearing housing by placing the snap ring and the diffuser component in the space.

The snap ring is configured to come into abutment with the outer peripheral-side wall portion of the insert component in a state in which the snap ring is inserted in the first circumferential groove. As a result, the pressing force transmitted from the snap ring to the insert component can be efficiently transmitted to the thrust plate via the protruding portion protruding from the outer peripheral-side wall portion.

(3) In several embodiments, in the turbocharger according to item (2), the diffuser component includes: a plate-shaped diffuser portion having the diffuser surface; and a plate-shaped outer peripheral-side plate portion extending along the axial direction of the rotation shaft from an outer peripheral end portion of the diffuser portion. The outer peripheral-side plate portion is configured to come into abutment with an inner peripheral wall surface of the bearing housing along the axial direction of the rotation shaft.

According to the embodiments described in item (3), the outer peripheral-side plate portion of the diffuser component is configured to come into abutment with an inner peripheral wall surface of the bearing housing along the axial direction of the rotation shaft. As a result, in the bearing housing, the accuracy of positioning the diffuser component in the direction orthogonal to the axis of the rotation shaft can be enhanced.

(4) In several embodiments, in the turbocharger according to item (3), the insert component includes a projecting portion protruding from an outer peripheral end portion of the inner peripheral portion to an outer peripheral side. The diffuser component includes a plate-shaped inner peripheral-side plate portion extending from an inner peripheral end portion of the diffuser portion toward the inner peripheral portion of the insert component. In a state in which the insert component and the diffuser component are accommodated in the bearing housing, an inner peripheral end of the inner peripheral-side plate portion is configured to be positioned farther from the end portion of the bearing housing on one side thereof than the projecting portion in the axial direction of the rotation shaft, and positioned closer to the rotation shaft than an outer peripheral end of the projecting portion in the direction orthogonal to the axis of the rotation shaft.

According to the embodiments described in item (4), when the diffuser component is about to fall out of the opening in the end portion of the bearing housing on one side thereof, the inner peripheral-side plate portion of the diffuser component is caught by the projecting portion of the insert component. As a result, the diffuser component can be prevented from falling out.

(5) In several embodiments, in the turbocharger according to (3) or (4) described above, a radially outer portion of the diffuser component is formed to be larger than a radially inner portion of the end portion of the bearing housing on one side thereof. The diffuser component is press fitted in the bearing housing to be fixed in the bearing housing.

According to the embodiments described in item (5), the diffuser component can be fixed in the bearing housing through a simple structure in which the diffuser component is simply press fitted in the bearing housing.

(6) In several embodiments, in the turbocharger according to any one of (3) to (5), a radially inner portion of the diffuser component is formed to be smaller than a radially outer portion of an outer peripheral end surface of the inner peripheral portion of the insert component. The diffuser component is fitted with the outer peripheral end surface of the inner peripheral portion of the insert component to be fixed in the bearing housing.

According to the embodiments described in item (6), the diffuser component can be fixed in the bearing housing through a simple structure in which the outer peripheral end surface of the inner peripheral portion of the insert component is simply fitted with the diffuser component.

(7) In several embodiments, in the turbocharger according to item (3) or (4), the inner peripheral wall surface of the bearing housing has a second circumferential groove formed therein at a position closer to the end portion of the bearing housing on one side thereof than a position of the first circumferential groove in the axial direction of the rotation shaft. The diffuser component includes a plate-shaped insert plate portion extending from the outer peripheral-side plate portion to an outer peripheral side. The insert plate portion is configured to be inserted in the second circumferential groove.

According to the embodiments described in item (7), the diffuser component can be fixed in the bearing housing through a simple structure in which the insert plate portion of the diffuser component is simply inserted in the second circumferential groove. According to the embodiment as above, the dimension tolerance of the diffuser component on the outer peripheral side can be set to be loose.

(8) In several embodiments, in the turbocharger according to item (7), the second circumferential groove is formed over an entire periphery of the inner peripheral wall surface of the bearing housing. The insert plate portion is configured to be inserted in the second circumferential groove over the entire periphery of the inner peripheral wall surface of the bearing housing.

According to the embodiments described in item (8), the diffuser component can be securely fixed in the bearing housing because the insert plate portion of the diffuser component is inserted in the second circumferential groove over the entire periphery of the inner peripheral wall surface of the bearing housing.

(9) In several embodiments, in the turbocharger according to item (7), the first circumferential groove is formed over an entire periphery of the inner peripheral wall surface of the bearing housing. The snap ring has a spaced section formed by spacing arc shaped end portions from each other. The outer peripheral-side plate portion of the diffuser component includes a first outer peripheral-side plate portion, and a second outer peripheral-side plate portion formed at a position different from the first outer peripheral-side plate portion in a circumferential direction and having an extending length shorter than an extending length of the first outer peripheral-side plate portion. The insert plate portion of the diffuser component includes a first insert plate portion extending from the first outer peripheral-side plate portion to the outer peripheral side, and a second insert plate portion extending from the second outer peripheral-side plate portion to the outer peripheral side. The second insert plate portion is configured to be inserted in the second circumferential groove. The first insert plate portion is configured to be inserted in the first circumferential groove at the spaced section of the snap ring inserted in the first circumferential groove.

According to the embodiments described in item (9), the snap ring has the spaced section formed by separating the end portions of an arc shape from each other. The first insert plate portion is configured to be inserted in the first circumferential groove at the spaced section of the snap ring inserted in the first circumferential groove. In this way, the part of the bearing housing to be processed can be kept at a minimum by effectively utilizing the first circumferential groove formed for inserting the snap ring therein. The diffuser component can be securely fixed in the bearing housing by inserting the second insert plate portion in the second circumferential groove in addition to inserting the first insert plate portion in the first circumferential groove.

(10) In several embodiments, in the turbocharger according to item (9), when the diffuser component is viewed from the axial direction of the rotation shaft, the second insert plate portion is formed at a position opposed to the first insert plate portion in the circumferential direction.

According to the embodiments described in item (10), the first insert plate portion and the second insert plate portion are formed at positions opposed to each other in the circumferential direction. As a result, the diffuser component can be securely fixed by the inside of the bearing housing because the diffuser component can be supported by two places opposed to each other in the circumferential direction.

(11) In several embodiments, in the turbocharger according to item (9) or (10), the diffuser component includes a plate-shaped cylindrical plate portion extending from an inner peripheral end portion of the diffuser portion toward the insert component along the axial direction of the rotation shaft. The insert component includes a projecting portion protruding from an outer peripheral end surface of the inner peripheral portion to an outer peripheral side, and at least one projecting portion is formed in the circumferential direction or the projecting portion is formed in plurality at intervals in the circumferential direction. A recessed portion or a slit, in which the projecting portion is inserted when the cylindrical plate portion is fitted with the outer peripheral end portion of the inner peripheral portion of the insert component, is formed in an inner peripheral surface of the cylindrical plate portion along the axial direction of the rotation shaft.

According to the embodiments described in item (11), the cylindrical plate portion of the diffuser component is fitted with the outer peripheral end surface of the inner peripheral portion of the insert component 6 in addition to inserting the first insert plate portion in the first circumferential groove and inserting the second insert plate portion in the second circumferential groove. As a result, the diffuser component can be securely fixed by the inside of the bearing housing.

The recessed portion or the slit in which the projecting portion is inserted when the cylindrical plate portion is fitted with the outer peripheral end surface of the inner peripheral portion of the insert component is formed in the inner peripheral surface of the cylindrical plate portion along the axial direction of the rotation shaft. As a result, the diffuser component can be easily positioned in the circumferential direction by inserting the diffuser component in the bearing housing along the axial direction of the rotation shaft so that the projecting portion is inserted in the recessed portion or the slit.

(12) In several embodiments, in the turbocharger according to item (2) or (3), the diffuser component includes a plate-shaped horizontal plate portion extending from an inner peripheral end portion of the diffuser portion toward the insert component along the axial direction of the rotation shaft. The horizontal plate portion has a distal end on which a bulged portion bulging more than other portions of the horizontal plate portion is formed. The outer peripheral-side wall portion of the insert component has a fitting groove formed therein, with which the distal end of the horizontal plate portion can be fitted.

According to the embodiments described in item (12), the diffuser component can be fixed in the bearing housing through a simple structure in which the distal end of the horizontal plate portion of the diffuser component is simply fitted with the fitting groove of the insert component.

(13) In several embodiments, in the turbocharger according to any one of items (3) to (12), the diffuser component is formed of a plate-shaped component formed by bending a metallic plate.

According to the embodiments described in item (13), the diffuser component can be formed by a simple method of simply bending a metallic plate. Furthermore, the surface roughness of a metallic plate is greater than that of a casting and the like. As a result, according to the embodiment as above, the pressure loss in the diffuser flow path can be reduced because the diffuser portion defining the diffuser flow path is made of a metallic plate.

(14) In several embodiments, in the turbocharger according to item (2), a diffuser portion of the diffuser component has a screw hole formed therein, with which a screw component can be threadedly engaged. The outer peripheral-side wall portion of the insert component has a screw hole formed therein, with which the screw component can be threadedly engaged. The diffuser component is fastened with the insert component by threadedly engaging the screw component with the screw hole in the diffuser component and the screw hole in the insert component from the diffuser surface of the diffuser component.

According to the embodiments described in item (14), the diffuser component can be fixed in the bearing housing through a simple structure in which the diffuser component is simply threadedly engaged with the insert component by the screw component.

(15) In several embodiments, in the turbocharger according to item (2), a screw groove having a predetermined length is formed in the inner peripheral wall surface of the bearing housing from the end portion on one side of the bearing housing along the axial direction of the rotation shaft. The diffuser component is formed to be an annular shape, and a screw thread that can threadedly engage with the screw groove is formed in the outer peripheral surface of the diffuser component.

According to the embodiments described in item (15), the diffuser component can be fixed in the bearing housing through a simple structure in which the outer peripheral surface of the diffuser component and the inner peripheral wall surface of the bearing housing are simply threadedly engaged with each other.

According to at least one embodiment of this invention, the turbocharger capable of enhancing the compression efficiency by filling the gap formed between the outer peripheral edge of the compressor impeller and the inner peripheral wall surface of the bearing housing through a simple structure can be provided. Thus, for example, when the compressor impeller is downsized, the bearing housing and the components accommodated in the bearing housing can be used in common for the turbocharger of the related-art.

DETAILED DESCRIPTION

Figure 1:
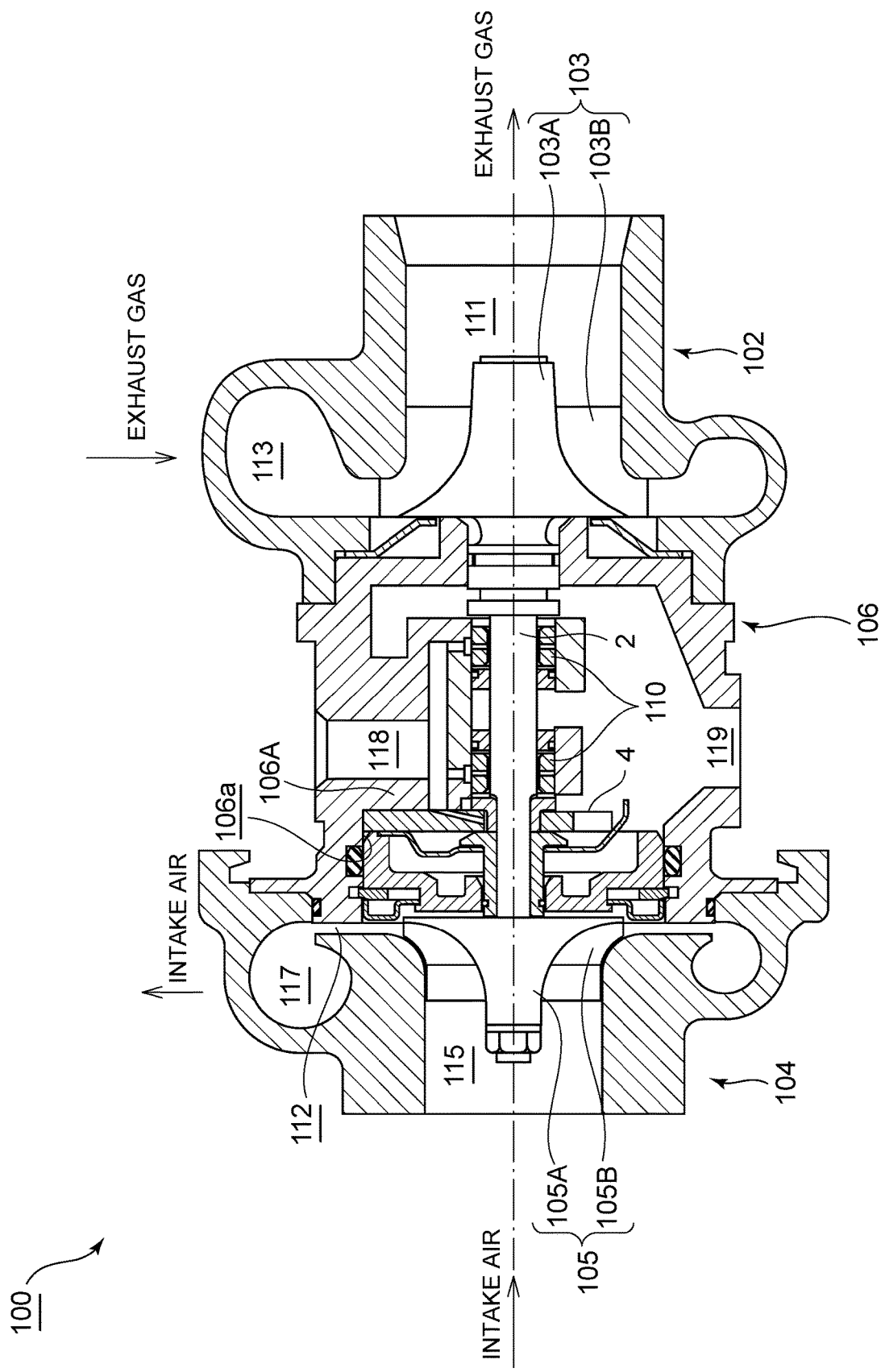
FIG. 1 is a sectional side view illustrating a cross section of a turbocharger according to one embodiment of this invention taken along the axial direction of a rotation shaft.

Several embodiments of this invention are described below with reference to the attached drawings. However, the dimensions, the materials, the shapes, the relative arrangement, and the like of the components described as embodiments and illustrated in the drawings are only examples and the scope of this invention is not intended to be limited thereto.

For example, expressions describing relative arrangements or absolute arrangements such as "to a direction", "along a direction", "parallel", "orthogonal", "center", "concentric", and "coaxial" not only precisely describe those arrangements, but also describe states relatively changing depending on a tolerance or on an angle or a distance allowing the same function to be achieved.

For example, expressions indicating that elements are in the same state such as "same", "equal", and "homogeneous" not only describe states that are precisely equal, but also describe states in which a tolerance or a difference achieving the same function exists.

For example, expressions describing shapes such as a quadrangle and a cylinder not only describe shapes such as a quadrangle and a cylinder in geometrically precise terms, but also describe shapes including recessed portions, projecting portions, chamfered portions, and the like within the range in which the same effect is achieved.

Expressions of "comprising", "including", or "having" a component are not exclusive expressions excluding the existence of other components.

In the description below, the same configurations are sometimes denoted by the same numerals to omit the detailed description thereof.

FIG. 1 is a sectional side view illustrating the cross section of a turbocharger according to one embodiment of this invention taken along the axial direction of a rotation shaft of the turbocharger.

The turbocharger according to one embodiment of this invention is not particularly limited, but is, for example, a turbocharger mounted on an engine for an automobile.

As illustrated in FIG. 1, a turbocharger 100 of this embodiment includes three housings, that is, a turbine housing 102 configured to accommodate a turbine impeller 103 provided on a rotation shaft 2 on one end side thereof, a compressor housing 104 configured to accommodate a compressor impeller 105 provided on the rotation shaft 2 on the other end side thereof, and a bearing housing 106 configured to accommodate a radial bearing 110 configured to support the rotation shaft 2 in a rotatable manner and a thrust plate 4 configured to support the thrust force (axial force) of the rotation shaft 2.

A spiral-shaped turbine scroll flow path 113 is formed at an outer peripheral portion of the turbine housing 102. The turbine impeller 103 is placed at a central part of the turbine scroll flow path 113. The turbine impeller 103 includes a turbine hub 103A having a truncated conical shape formed by cutting off a top portion of a cone along a plane parallel to the base thereof, and a plurality of turbine blades 103B provided to radially protrude from the peripheral surface of the turbine hub 103A. The turbine hub 103A of the turbine impeller 103 is bonded to one end portion of the rotation shaft 2 by welding, for example. Exhaust gas flowing through the turbine scroll flow path 113 and acting on the turbine impeller 103 is discharged to the outside of the turbine housing 102 from an exhaust gas discharging flow path 111 extending along the axial direction of the rotation shaft 2.

A spiral-shaped compressor scroll flow path 117 is formed at an outer peripheral portion of the compressor housing 104. The compressor impeller 105 is placed at a central part of the compressor scroll flow path 117. The compressor impeller 105 includes a compressor hub 105A having a truncated conical shape formed by cutting off a top portion of a cone along a plane parallel to the base thereof, and a plurality of compressor blades 105B provided to radially protrude from the peripheral surface of the compressor hub 105A. An insertion hole (not shown) to which the other end side of the rotation shaft 2 is inserted is formed at a central part of the compressor hub 105A of the compressor impeller 105. The compressor impeller 105 is fixed to the other end portion of the rotation shaft 2 by inserting one end side of the rotation shaft 2 into the insertion hole and fastening a nut 116 from the tip of the compressor hub 105A. Intake air flowing through an intake air introducing flow path 115 extending along the axial direction of the rotation shaft 2 and compressed by the compressor impeller 105 is introduced to the compressor scroll flow path 117 via a diffuser flow path 112 extending along the direction orthogonal to the axis of the rotation shaft 2, and is supplied to an engine (not shown).

The bearing housing 106 is placed between the turbine housing 102 and the compressor housing 104. The bearing housing 106 is connected, at an end portion 106D on one side thereof, to the compressor housing 104, and connected, at an end portion 106D on the other side thereof, to the turbine housing 102. The diffuser flow path 112 described above is defined between the bearing housing 106 and the compressor housing 104.

A protruding wall portion 106A protruding from an inner peripheral wall surface 106a of the bearing housing 106 is formed in the bearing housing 106. A lubricant oil introducing path 118 configured to introduce lubricant oil to be supplied to the radial bearing 110 and the thrust plate 4 described above is formed in the protruding wall portion 106A. The lubricant oil introduced into the bearing housing 106 from the lubricant oil introducing path 118 lubricates the radial bearing 110 and the thrust plate 4 and is discharged to the outside of the bearing housing 106 from a lubricant oil outlet 119 formed in a lower part of the bearing housing 106.

FIG. 2A, FIG. 3A, FIG. 4A, FIG. 5A, FIG. 6A, FIG. 7A, FIG. 8A, and FIG. 9A each are a sectional view of the main part of a turbocharger according to one embodiment of this invention. FIG. 2B, FIG. 3B, FIG. 4B, FIG. 5B, FIG. 6B, FIG. 7B, FIG. 8B, and FIG. 9B each are a view illustrating each diffuser component of the turbochargers illustrated in FIG. 2A, FIG. 3A, FIG. 4A, FIG. 5A, FIG. 6A, FIG. 7A, FIG. 8A, and FIG. 9A in which (a) is a sectional side view of the diffuser component and (b) is a perspective view of the diffuser component. FIG. 4C is a view for describing the assembling state of an insert component, a snap ring, and the diffuser component in the turbocharger illustrated in FIG. 4A. FIG. 5C is a view for describing the assembling state of an insert component, a snap ring, and the diffuser component in the turbocharger illustrated in FIG. 5A. FIG. 6C is a view for describing the assembling state of an insert component, a snap ring, and the diffuser component in the turbocharger illustrated in FIG. 6A.

As illustrated in FIG. 2A, FIG. 3A, FIG. 4A, FIG. 5A, FIG. 6A, FIG. 7A, FIG. 8A, and FIG. 9A, in the turbocharger 100 according to at least one embodiment of this invention, at least an insert component 6, a snap ring 8, and a diffuser component 9 in addition to the thrust plate 4 described above are accommodated in the bearing housing 106.

As described above, the thrust plate 4 is configured to support the rotation shaft 2 in the axial direction.

In the embodiment illustrated in the drawings, the thrust plate 4 is an annular plate-shaped component having an insertion hole 4A through which the rotation shaft 2 is inserted. The thrust plate 4 is accommodated in the bearing housing 106 in a state in which one surface 4a of the thrust plate 4 is in abutment with a side surface of the protruding wall portion 106A of the bearing housing 106.

In the embodiment illustrated in the drawings, a first thrust collar 3A and a second thrust collar 3B located at a position closer to an end portion 106D of the bearing housing 106 on one side thereof (the end portion 106D on the side connected to the compressor housing 104) than a position of the first thrust collar 3A are mounted on the rotation shaft 2. The first thrust collar 3A and the second thrust collar 3B respectively have cylindrical collar main body portions 3A1 and 3B1 and large-diameter portions 3A2 and 3B2 formed to have diameters larger than those of the collar main body portions 3A1 and 3B1, and are mounted on the outer periphery of the rotation shaft 2 so as to be rotatable with the rotation shaft 2. The collar main body portion 3A1 of the first thrust collar 3A is inserted in the insertion hole 4A in the thrust plate 4. The thrust plate 4 is accommodated in a recessed portion formed between the large-diameter portion 3A2 of the first thrust collar 3A and the large-diameter portion 3B2 of the second thrust collar 3B. The thrust plate 4 is configured to be in sliding contact with the large-diameter portion 3A2 of the first thrust collar 3A and the large-diameter portion 3B2 of the second thrust collar 3B to support the rotation shaft 2 in the axial direction.

The insert component 6 is accommodated in the bearing housing 106 at a position closer to the end portion 106D of the bearing housing 106 on one side thereof than a position of the thrust plate 4 in the axial direction of the rotation shaft 2. The insert component 6 is configured to retain the thrust plate 4 between the insert component 6 and the protruding wall portion 106A of the bearing housing 106.

In the embodiment illustrated in the drawings, the insert component 6 includes an annular plate-shaped component having an insertion hole 6C. The main body portion 3B1 of the second thrust collar 3B mounted on the outer periphery of the rotation shaft 2 is inserted in the insertion hole 6C. The radially outer portion of the insert component 6 has substantially the same size as the radially inner portion of the bearing housing 106. The outer peripheral surface of the insert component 6 is configured to come into abutment with the inner peripheral wall surface 106a of the bearing housing 106, and the inner peripheral surface of the insert component 6 is configured to be in sliding contact with the outer peripheral surface of the main body portion 3B1 of the second thrust collar 3B. An annular seal groove is formed in the inner peripheral wall surface 106a of the bearing housing 106 positioned on the outer peripheral side of the insert component 6. An annular seal component 7 such as an O ring is placed in the seal groove.

In the embodiment illustrated in the drawings, an oil deflector 5 is placed between the thrust plate 4 and the insert component 6. The oil deflector 5 is a component configured to prevent the lubricant oil supplied to the thrust plate 4 from leaking out to the compressor impeller 105 side, and is an annular plate-shaped component made of a metallic plate, for example. The oil deflector 5 is fixed in the bearing housing 106 by sandwiching a part of the outer peripheral edge thereof between the thrust plate 4 and the insert component 6.

The snap ring 8 is inserted in a first circumferential groove 81 formed in the inner peripheral wall surface 106a of the bearing housing 104, to thereby fix the insert component 6 in a state in which the insert component 6 is pressed against the thrust plate 4.

The diffuser component 9 has a diffuser surface 91a extending along the direction orthogonal to the axis of the rotation shaft 2 between the inner peripheral wall surface 106a of the end portion 106D of the bearing housing 106 on one side thereof and an outer peripheral edge 105a of the compressor impeller 105. In the embodiment illustrated in the drawings, the diffuser surface 91a is formed with the same width in the circumferential direction.

In the turbocharger 100 according to one embodiment of this invention configured as above, a gap S between the outer peripheral edge 105a of the compressor impeller 105 and the inner peripheral wall surface 106a of the end portion 106D of the bearing housing 106 on one side thereof is filled with the diffuser surface 91a of the diffuser component 9 described above, and hence the intake air flowing through the diffuser flow path 112 can be prevented from flowing into the gap S to enhance the compression efficiency of the turbocharger 100.

Specifically, as illustrated in FIG. 2A, FIG. 3A, FIG. 4A, FIG. 5A, FIG. 6A, FIG. 7A, FIG. 8A, and FIG. 9A, in the turbocharger 100 according to one embodiment of this invention, the radially outer portion of the compressor impeller 105 is smaller than the radially inner portion of the end portion 106D of the bearing housing 106 on one side thereof. Thus, the gap S is formed between the inner peripheral wall surface 106a of the end portion 106D of the bearing housing 106 on one side thereof and the outer peripheral edge 105a of the compressor impeller 105. In the embodiment illustrated in the drawings, the size of the gap S is from 2% to 30% of an internal radius R of the end portion 106D of the bearing housing 106 on one side thereof. When the gap S as above is formed in a flow path surface defining the diffuser flow path 112, the intake air flowing through the diffuser flow path 112 flows into the gap S to cause a large pressure loss. Thus, the decrease in the compression efficiency of the turbocharger 100 due to the intake air flowing into the gap S can be prevented by filling the gap S with the diffuser surface 91a of the diffuser component 9 described above.

Thus, according to one embodiment of this invention as described above, for example, when the compressor impeller 105 is downsized, the bearing housing and the components accommodated in the bearing housing can be used in common for the turbocharger of the related-art.

Figure 10:
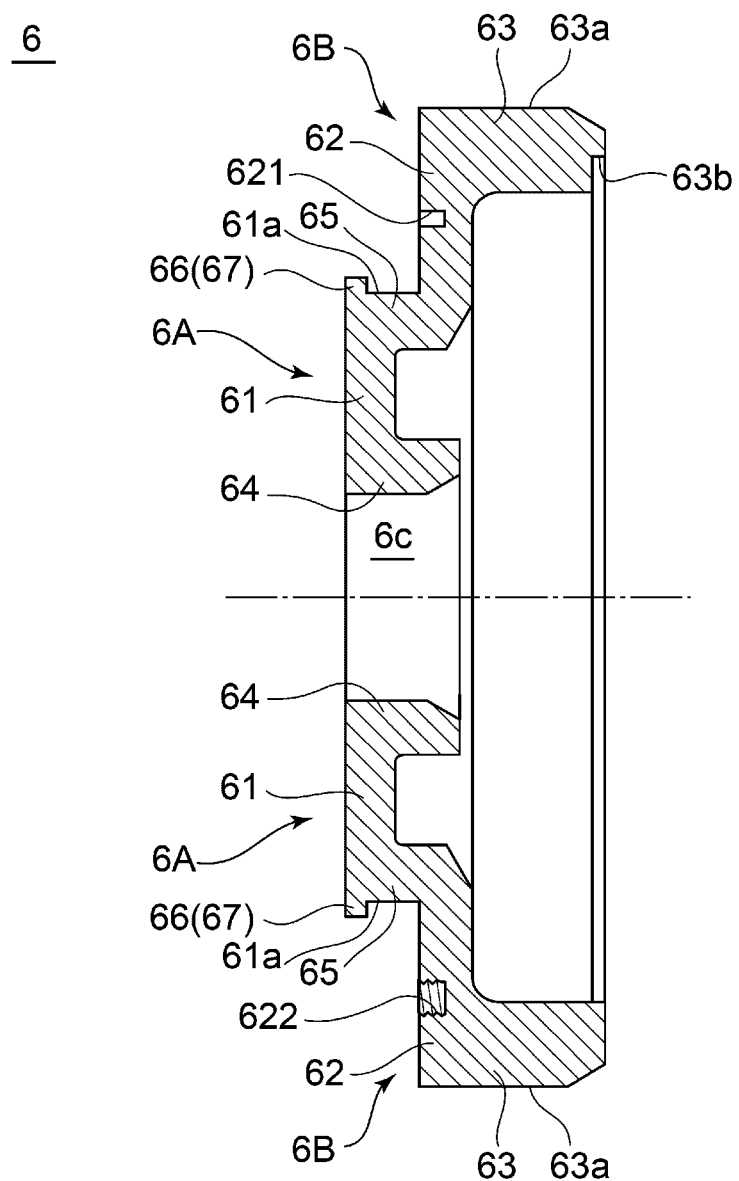
FIG. 10 is an enlarged sectional side view illustrating an insert component according to one embodiment of this invention.

FIG. 10 is an enlarged sectional side view illustrating an insert component according to one embodiment of this invention.

In several embodiments, as illustrated in FIG. 2A, FIG. 3A, FIG. 4A, FIG. 5A, FIG. 6A, FIG. 7A, FIG. 8A, FIG. 9A, and the enlarged view of FIG. 10, the insert component 6 includes an inner peripheral portion 6A including an inner peripheral-side wall portion 61 extending along the direction orthogonal to the axis of the rotation shaft 2, and an outer peripheral portion 6B including an outer peripheral-side wall portion 62 extending along the direction orthogonal to the axis of the rotation shaft 2 at a position farther from the end portion 106D of the bearing housing 106 on one side thereof than a position of the inner peripheral-side wall portion 61 and a protruding portion 63 protruding from the outer peripheral-side wall portion 62 toward the thrust plate 4. The snap ring 8 is configured to be positioned on the outer peripheral side of the inner peripheral portion 6A of the insert component 6 and configured to come into abutment with the outer peripheral-side wall portion 62 of the insert component 6 in a state in which the snap ring 8 is inserted in the first circumferential groove 81. The diffuser component 9 is configured to be positioned on the outer peripheral side of the inner peripheral portion 6A of the insert component 6.

In the embodiment illustrated in the drawings, the protruding portion 63 of the insert component 6 protrudes from an outer peripheral end portion of the outer peripheral-side wall portion 62. An outer peripheral surface 63a of the protruding portion 63 is in abutment with the inner peripheral wall surface 106a of the bearing housing 106. The distal end of the protruding portion 63 is in abutment with an outer peripheral end portion of another surface 4b of the thrust plate 4. A step portion 63b configured to come into abutment with an outer peripheral end portion of the oil deflector 5 is formed in the distal end of the protruding portion 63.

In the embodiment illustrated in the drawings, the inner peripheral portion 61 of the insert component 6 includes an extension portion 64 extending from an inner peripheral end portion of the inner peripheral-side wall portion 61 toward the thrust plate 4 along the axial direction of the rotation shaft 2. A connection portion 65 configured to connect the inner peripheral portion 6A and the outer peripheral portion 6B to each other is formed between the inner peripheral portion 6A and the outer peripheral portion 6B.

According to the embodiment as above, in the insert component 6, the outer peripheral-side wall portion 62 of the outer peripheral portion 6B is at a position farther from the end portion 106D of the bearing housing 106 on one side thereof than a position of the inner peripheral-side wall portion 61 of the inner peripheral portion 6A. Specifically, the outer peripheral-side wall portion 62 is positioned closer to the thrust plate 4 than the inner peripheral-side wall portion 61. As a result, a space is formed between the inner peripheral portion 6A on the outer peripheral side thereof and the inner peripheral wall surface 106a of the bearing housing 106. Thus, the insert component 6, the snap ring 8, and the diffuser component 9 can be compactly placed in the bearing housing 106 by placing the snap ring 8 and the diffuser component 9 in the space.

The snap ring 8 is configured to come into abutment with the outer peripheral-side wall portion 62 of the insert component 6 in a state in which the snap ring 8 is inserted in the first circumferential groove 81. As a result, the pressing force transmitted from the snap ring 8 to the insert component 6 can be efficiently transmitted to the thrust plate 4 via the protruding portion 63 protruding from the outer peripheral-side wall portion 62.

In several embodiments, as illustrated in FIG. 2A, FIG. 2B, FIG. 3A, FIG. 3B, FIG. 4A, FIG. 4B, FIG. 4C, FIG. 5A, FIG. 5B, FIG. 5C, FIG. 6A, FIG. 6B, and FIG. 6C, the diffuser component 9 includes a plate-shaped diffuser portion 91 having the diffuser surface 91a, and a plate-shaped outer peripheral-side plate portion 92 extending from an outer peripheral end portion of the diffuser portion 91 along the axial direction of the rotation shaft 2. The outer peripheral-side plate portion 92 is configured to come into abutment with the inner peripheral wall surface 106a of the bearing housing 106 along the axial direction of the rotation shaft 2.

According to the embodiment as above, the outer peripheral-side plate portion 92 of the diffuser component 9 is configured to come into abutment with the inner peripheral wall surface 106a of the bearing housing 106 along the axial direction of the rotation shaft 2. As a result, in the bearing housing 106, the accuracy of positioning the diffuser component 9 in the direction orthogonal to the axis of the rotation shaft 2 can be enhanced.

Figure 2A:
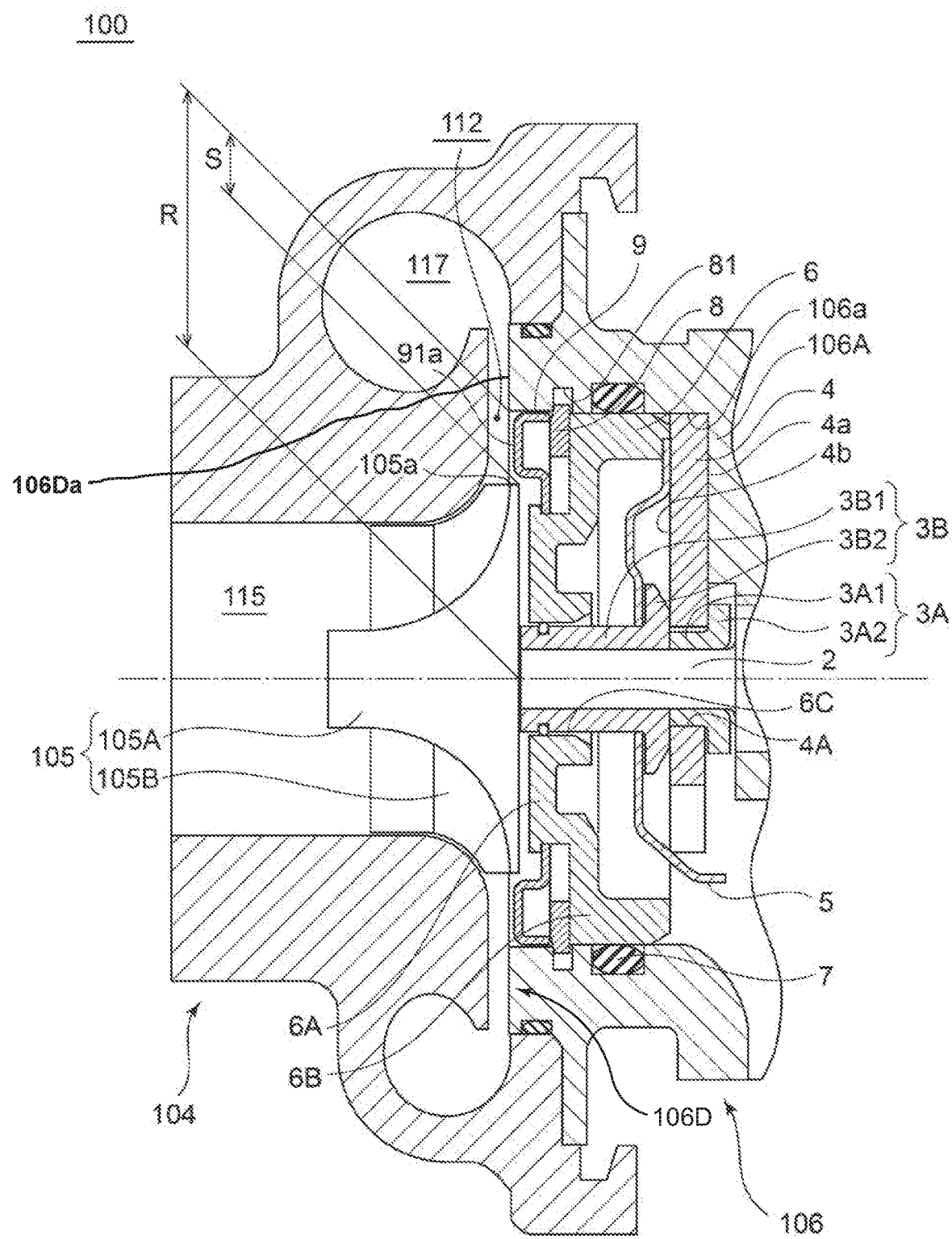
FIG. 2A is a sectional view of the main part of a turbocharger according to one embodiment of this invention.
Figure 3A:
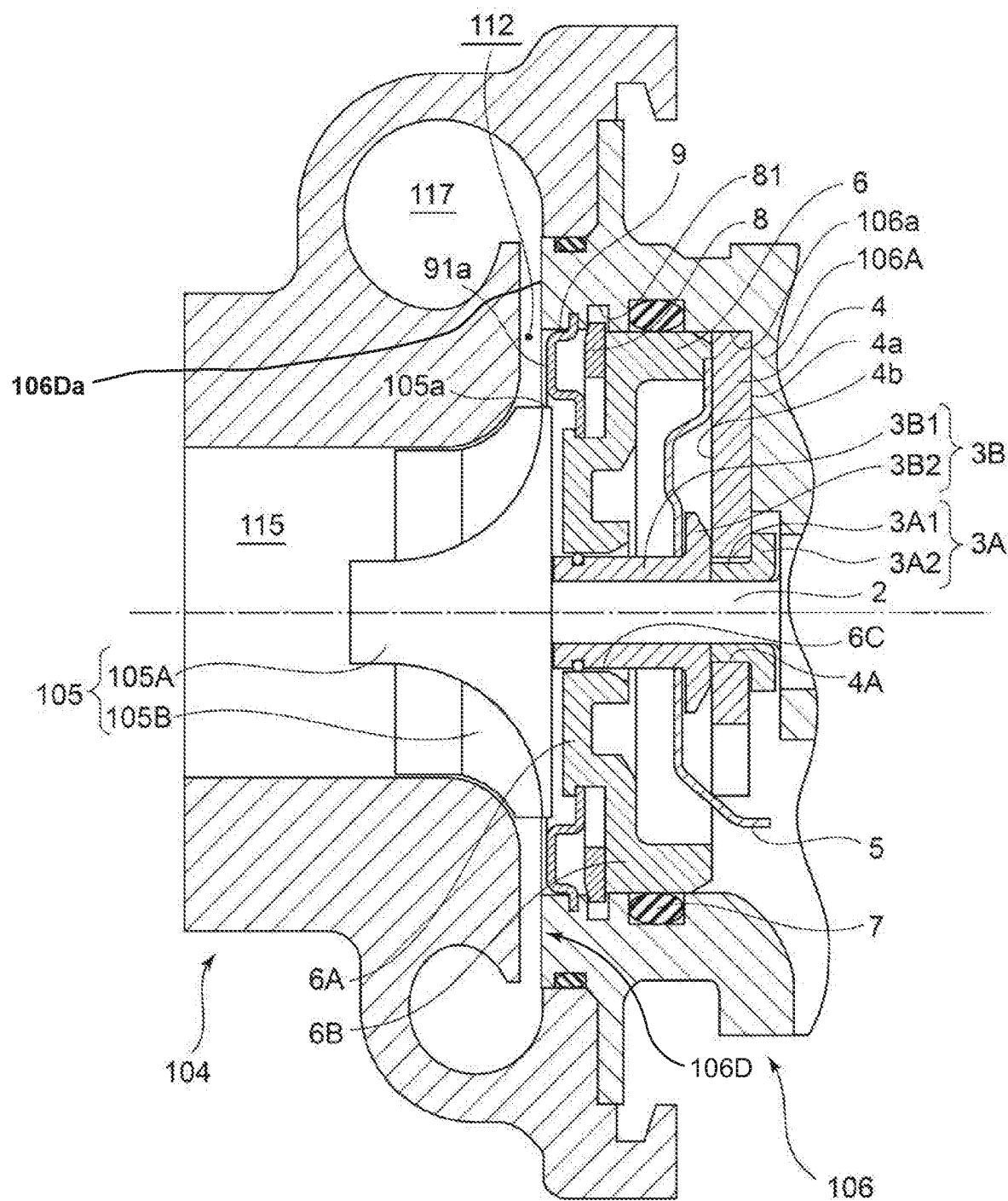
FIG. 3A is a sectional view of the main part of a turbocharger according to one embodiment of this invention.
Figure 3B:
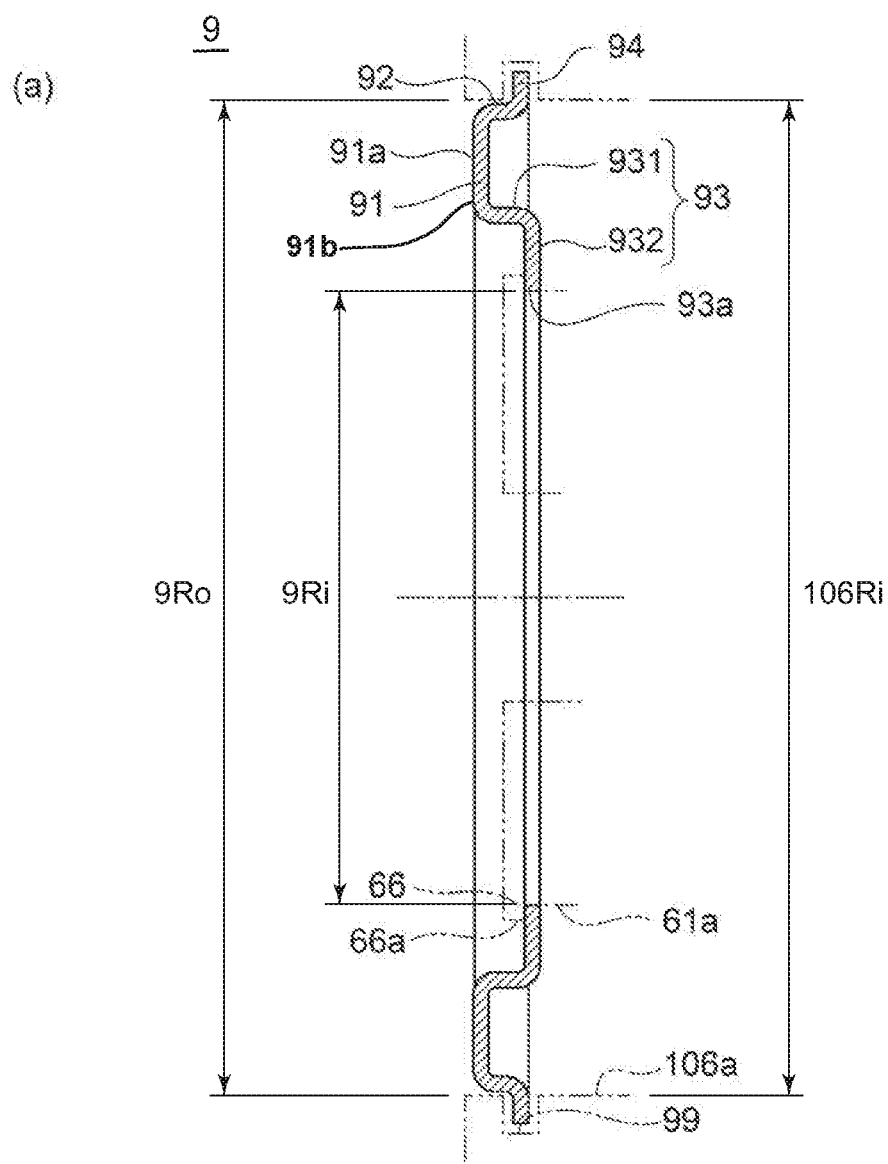
FIG. 3B is a view illustrating a diffuser component in the turbocharger illustrated in FIG. 3A in which (a) is a sectional side view of the diffuser component and (b) is a perspective view of the diffuser component.
Figure 3B:
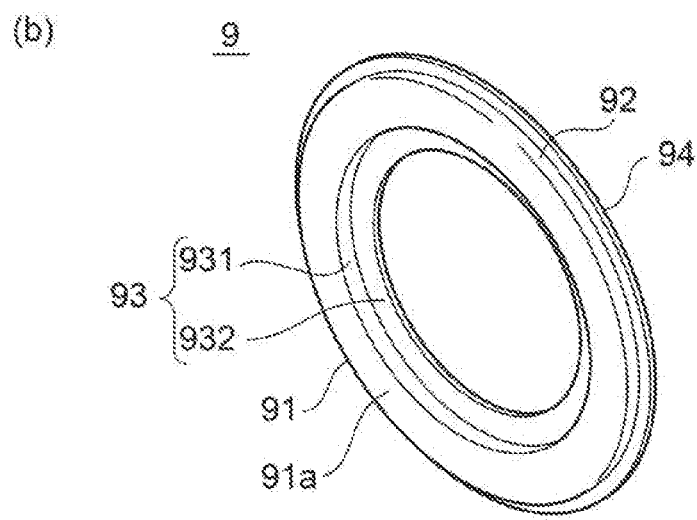
Figure 4A:
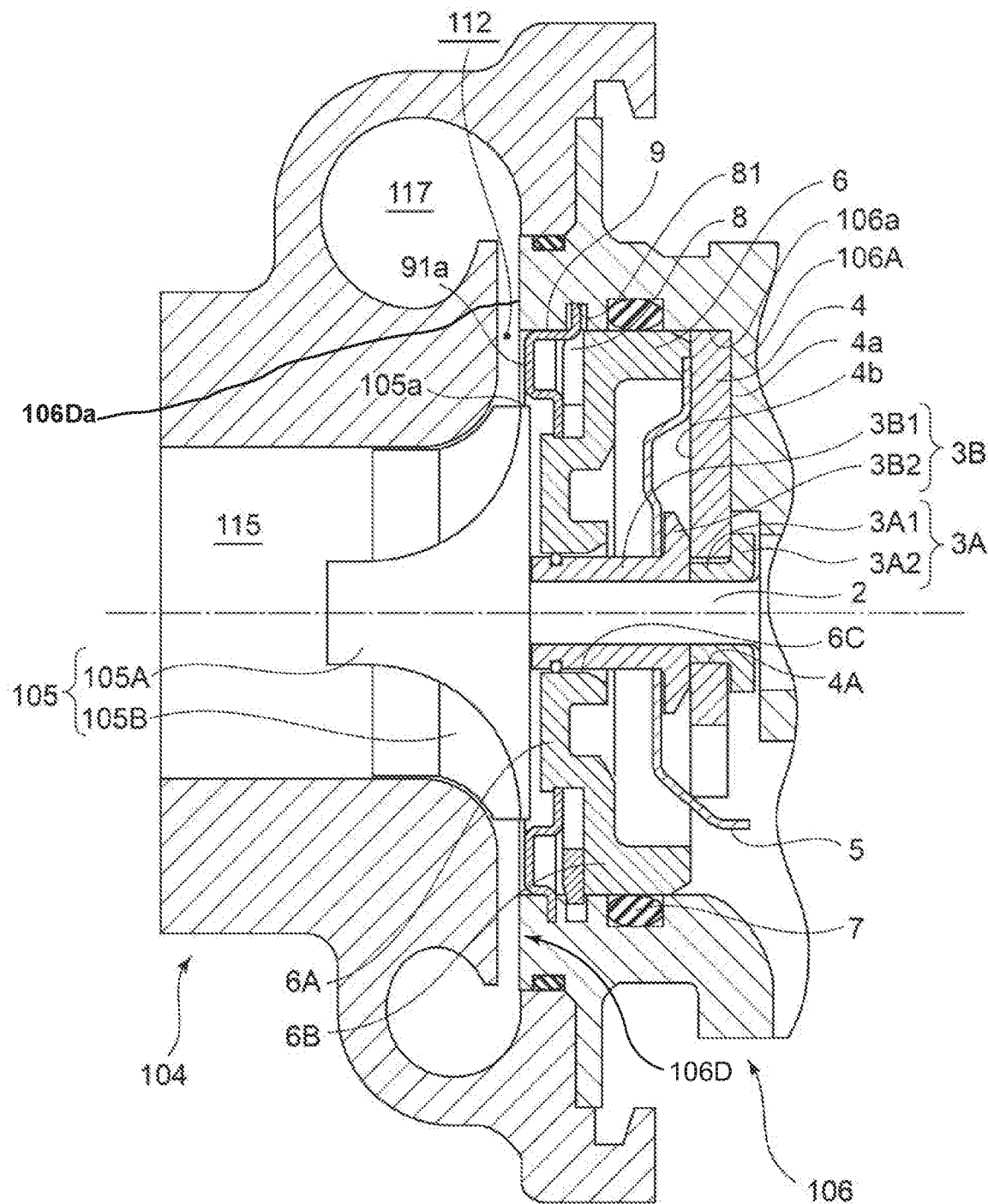
FIG. 4A is a sectional view of the main part of a turbocharger according to one embodiment of this invention.
Figure 4B:
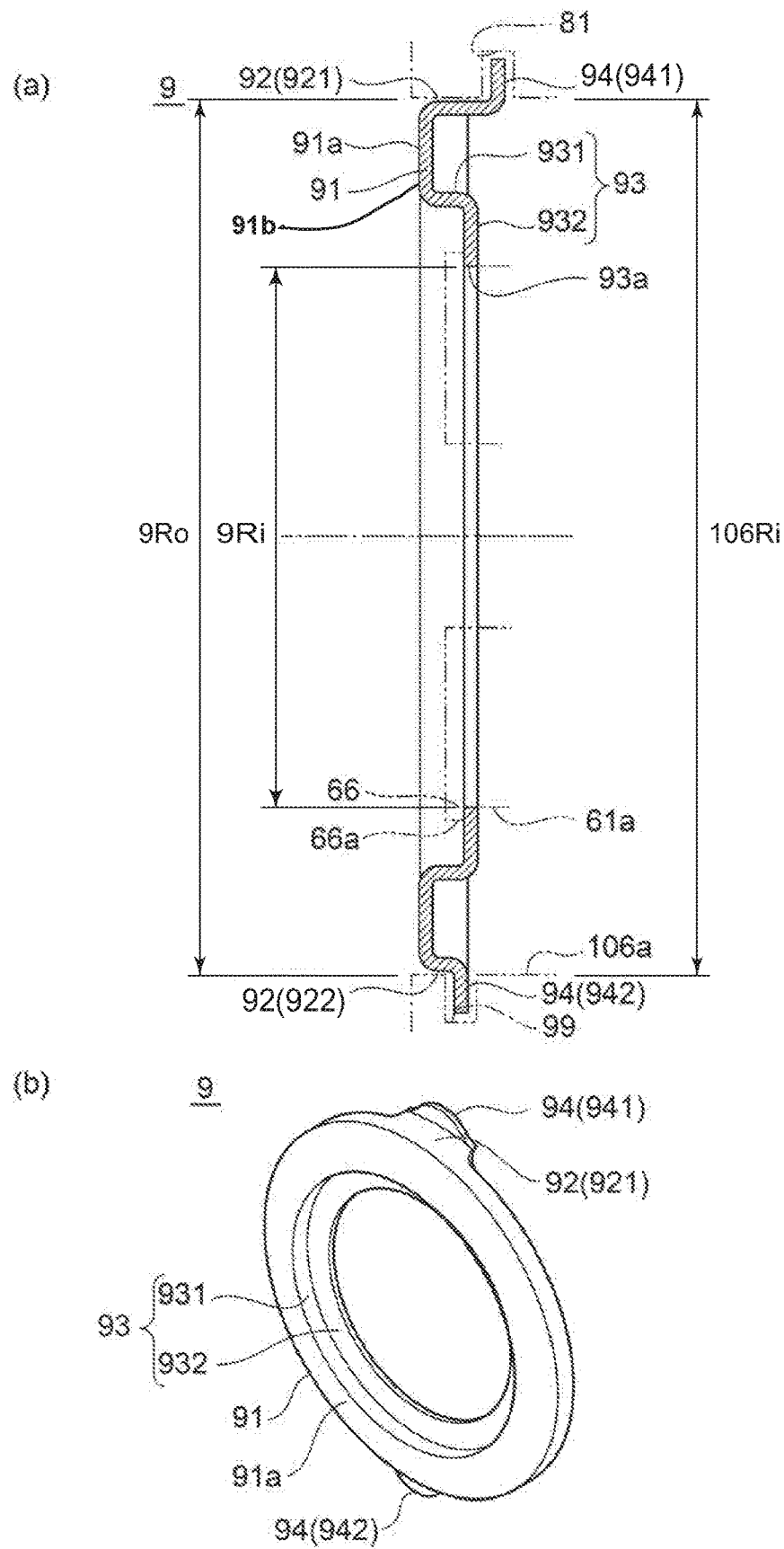
FIG. 4B is a view illustrating a diffuser component in the turbocharger illustrated in FIG. 4A in which (a) is a sectional side view of the diffuser component and (b) is a perspective view of the diffuser component.
Figure 4C:
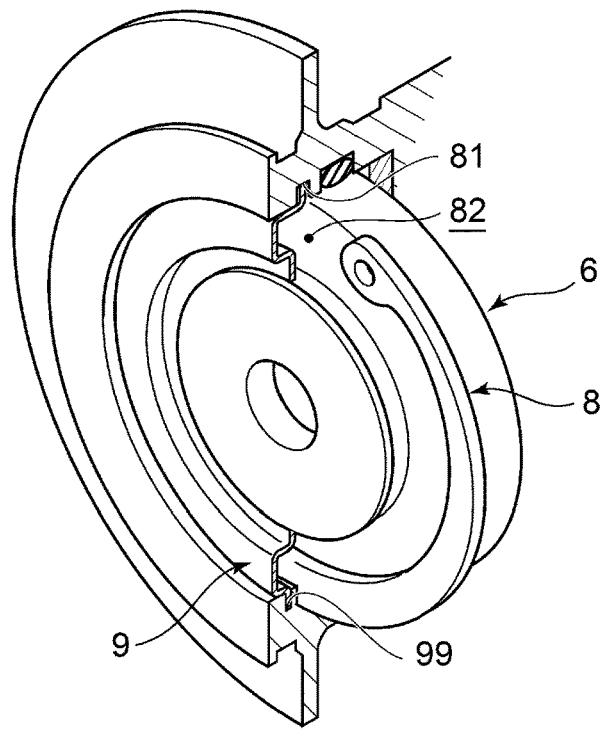
FIG. 4C is a view for describing the assembling state of an insert component, a snap ring, and the diffuser component in the turbocharger illustrated in FIG. 4A.
Figure 4C:
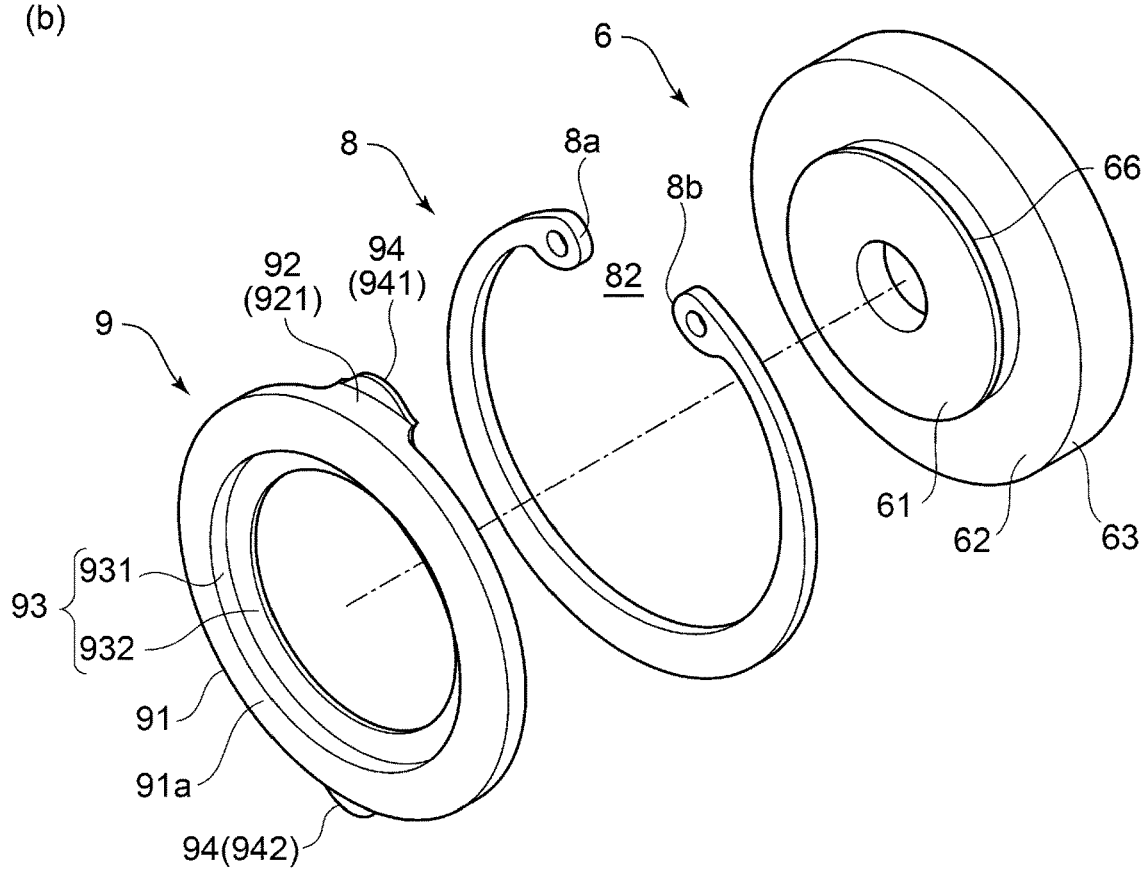

In several embodiments, as illustrated in FIG. 2A, FIG. 3B, FIG. 3A, and FIG. 3B, the insert component 6 includes a projecting portion 66 protruding from an outer peripheral end surface 61a of the inner peripheral portion 6A to the outer peripheral side. The diffuser component 9 includes a plate-shaped inner peripheral-side plate portion 93 extending from an inner peripheral end portion 91b of the diffuser portion 91 toward the inner peripheral portion 6A of the insert component 6. In a state in which the insert component 6 and the diffuser component 9 are accommodated in the bearing housing 106, an inner peripheral end 93a of the inner peripheral-side plate portion 93 is configured to be positioned farther from the end portion 106D of the bearing housing 106 on one side thereof than the projecting portion 66 in the axial direction of the rotation shaft 2, and positioned closer to the rotation shaft 2 than an outer peripheral end 66a of the projecting portion 66 in the direction orthogonal to the axis of the rotation shaft 2.

In the embodiment illustrated in the drawings, the inner peripheral-side plate portion 93 includes a horizontal portion 931 extending from the inner peripheral end portion of the diffuser portion 91 along the axial direction of the rotation shaft 2 and a vertical portion 932 extending from an end portion of the horizontal portion 931 along the direction orthogonal to the axis of the rotation shaft 2. The projecting portion 66 forms an annular shape continuously extending in the circumferential direction.

According to the embodiment as above, when the diffuser component 9 is about to fall out of the opening in the end portion 106D of the bearing housing 106 on one side thereof, the inner peripheral-side plate portion 93 of the diffuser component 9 is caught by the projecting portion 66 of the insert component 6. As a result, the diffuser component 9 can be prevented from falling out.

Figure 2B:
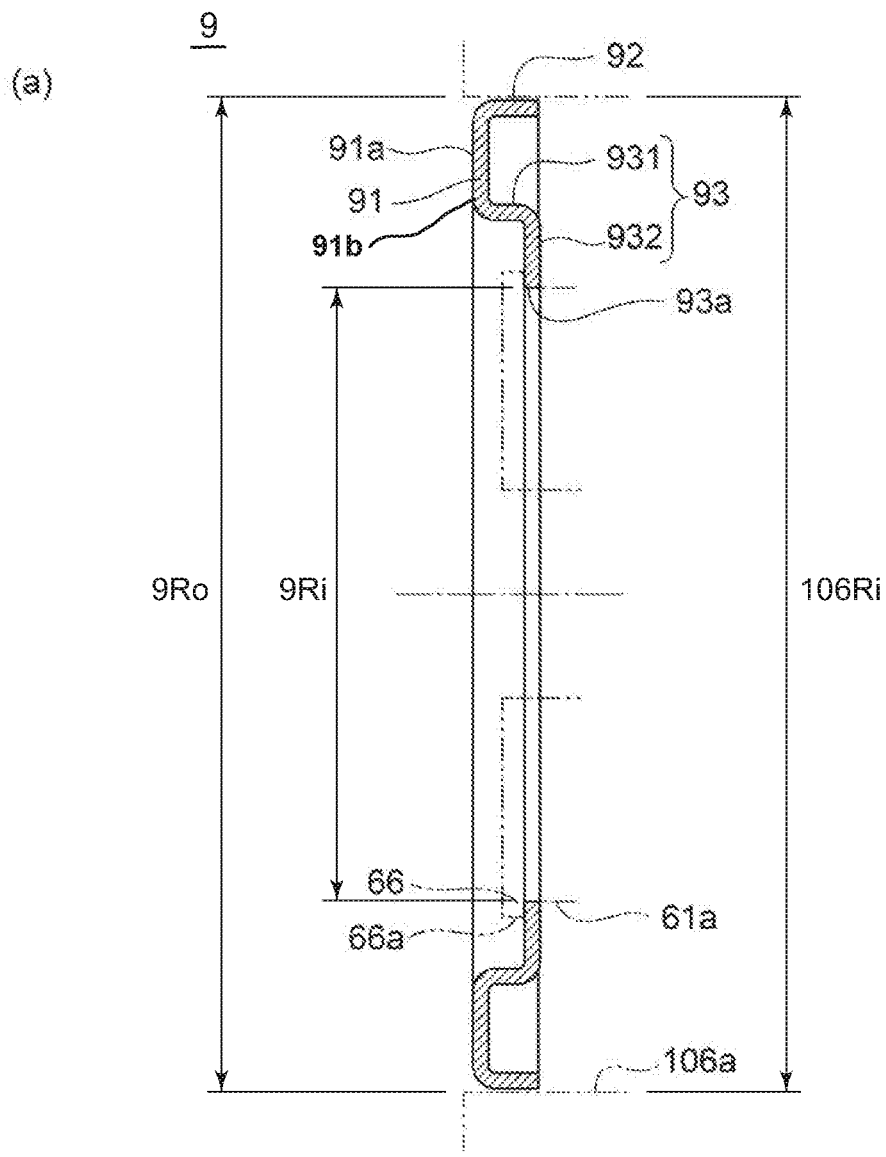
FIG. 2B is a view illustrating a diffuser component in the turbocharger illustrated in FIG. 2A in which (a) is a sectional side view of the diffuser component and (b) is a perspective view of the diffuser component.
Figure 2B:
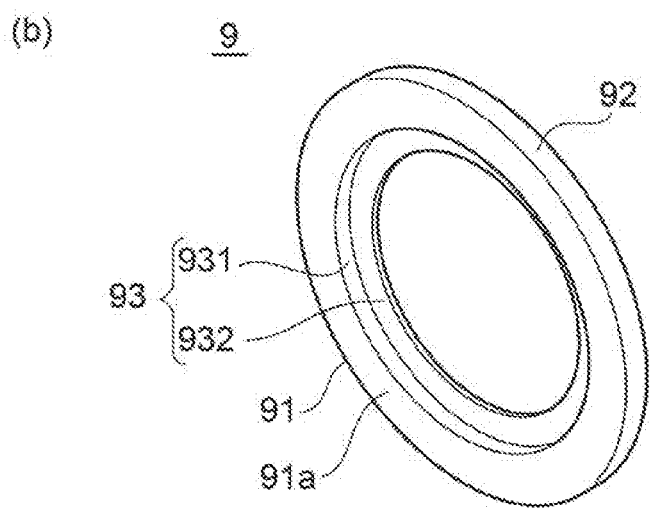

In several embodiments, the radially outer portion 9Ro of the plate-shaped outer peripheral-side plate portion 92 of the diffuser component 9 is formed to be larger than the radially inner portion 106Ri of the end portion 106D of the bearing housing 106 on one side thereof. As illustrated in FIG. 2A and FIG. 2B, the diffuser component 9 is press fitted in the bearing housing 106, to thereby be fixed in the bearing housing 106.

In the embodiment illustrated in the drawings, the radially outer portion 9Ro of the plate-shaped outer peripheral-side plate portion 92 of the diffuser component 9, specifically, the radially outer portion of the outer peripheral-side plate portion 92 in a state before the diffuser component 9 is press fitted in the bearing housing 106 is formed to be slightly larger than the radially inner portion 106Ri of the end portion 106D of the bearing housing 106 on one side thereof. By press fitting the diffuser component 9 in the bearing housing 106 from the opening in the end portion 106D of the bearing housing 106 on one side thereof, the diffuser component 9 is fixed in the bearing housing 106.

According to the embodiment as above, the diffuser component 9 can be fixed in the bearing housing 106 through a simple structure in which the diffuser component 9 is simply press fitted in the bearing housing 106.

In several embodiments, the radially inner portion 9Ri of the diffuser component 9 is formed to be smaller than the radially outer portion of the outer peripheral end surface 61a of the inner peripheral portion 6A of the insert component 6. As illustrated in FIG. 2A and FIG. 2B, the diffuser component 9 is fitted with the outer peripheral end surface 61a of the inner peripheral portion 6A of the insert component 6, to thereby be fixed in the bearing housing 106.

In the embodiment illustrated in the drawings, the radially inner portion 9Ri of the diffuser component 9, specifically, the radially inner portion of the inner peripheral-side plate portion 93 in a state before the diffuser component 9 is fitted with the outer peripheral end surface 61a of the inner peripheral portion 6A of the insert component 6 is formed to be slightly smaller than the radially outer portion of the outer peripheral end surface 61a of the inner peripheral portion 6A of the insert component 6. The diffuser component 9 is inserted in the bearing housing 106 from the opening in the end portion 106D of the bearing housing 106 on one side thereof, and the inner peripheral-side plate portion 93 of the diffuser component 9 is fitted with the outer peripheral end surface 61a of the inner peripheral portion 6A of the insert component 6, to thereby fix the diffuser component 9 to the inside of the bearing housing 106.

According to the embodiment as above, the diffuser component 9 can be fixed in the bearing housing 106 through a simple structure in which the diffuser component 9 is simply fitted with the outer peripheral end surface 61a of the inner peripheral portion 6A of the insert component 6.

In several embodiments, as illustrated in FIG. 2A, the diffuser component 9 is configured to come into abutment, at the distal end of the outer peripheral-side plate portion 92, with the snap ring 8 inserted in the first circumferential groove 81.

In the embodiment illustrated in the drawings, the diffuser component 9 is configured to be at a position suitable for the diffuser surface 91a of the diffuser portion 91 to define the diffuser flow path 112 in a state in which the distal end of the outer peripheral-side plate portion 92 is in abutment with the snap ring 8 inserted in the first circumferential groove 81.

According to the embodiment as above, when the diffuser component 9 is inserted in the bearing housing 106 from the opening in the end portion 106D of the bearing housing 106 on one side thereof, the diffuser component 9 can be easily positioned in the axial direction of the rotation shaft 2.

In several embodiments, as illustrated in FIG. 3A and FIG. 3B, a second circumferential groove 99 is formed in the inner peripheral wall surface 106a of the bearing housing 106 at a position closer to the end portion 106D of the bearing housing 106 on one side thereof than a position of the first circumferential groove 81 in the axial direction of the rotation shaft 2. The diffuser component 9 includes a plate-shaped insert plate portion 94 extending from the outer peripheral-side plate portion 92 to the outer peripheral side. The insert plate portion 94 is configured to be inserted in the second circumferential groove 99.

In the embodiment illustrated in the drawings, the insert plate portion 94 extends from the distal end of the outer peripheral-side plate portion 92 along the direction orthogonal to the axis of the rotation shaft 2. The position of the insert plate portion 94 in the axial direction of the rotation shaft 2 is closer to the end portion 106D of the bearing housing 106 on one side thereof than the vertical portion 932 of the inner peripheral-side plate portion 93.

According to the embodiment as above, the diffuser component 9 can be fixed in the bearing housing 106 through a simple structure in which the insert plate portion 94 of the diffuser component 9 is simply inserted in the second circumferential groove 99. According to the embodiment as above, the dimension tolerance of the diffuser component 9 on the outer peripheral side can be set to be loose.

In several embodiments, as illustrated in FIG. 3A and FIG. 3B, the second circumferential groove 99 is formed over the entire periphery of the inner peripheral wall surface 106a of the bearing housing 106. The insert plate portion 94 is configured to be inserted in the second circumferential groove 99 over the entire periphery of the inner peripheral wall surface 106a of the bearing housing 106.

According to the embodiment as above, the diffuser component 9 can be reliably fixed in the bearing housing 106 because the insert plate portion 94 of the diffuser component 9 is inserted in the second circumferential groove 99 over the entire periphery of the inner peripheral wall surface 106a of the bearing housing 106.

In several embodiments, as illustrated in FIG. 4A, FIG. 4B, FIG. 4C, FIG. 5A, FIG. 5B, FIG. 5C, FIG. 6A, FIG. 6B, and FIG. 6C, the first circumferential groove 81 is formed over the entire periphery of the inner peripheral wall surface 106a of the bearing housing 106. The snap ring 8 has a spaced section 82 formed by separating end portions 8a and 8b of an arc shape from each other. Specifically, the snap ring 8 is formed to have a C-shape in which a part of the annular shape is cut out. The outer peripheral-side plate portion 92 of the diffuser component 9 includes a first outer peripheral-side plate portion 921 and a second outer peripheral-side plate portion 922. The second outer peripheral-side plate portion 922 is formed at a position different from that of the first outer peripheral-side plate portion 921 in the circumferential direction and has an extending length that is shorter than that of the first outer peripheral-side plate portion 921. The insert plate portion 94 of the diffuser component 9 includes a first insert plate portion 941 extending from the first outer peripheral-side plate portion 921 to the outer peripheral side and a second insert plate portion 942 extending from the second outer peripheral-side plate portion 922 to the outer peripheral side. The second insert plate portion 942 is configured to be inserted in the second circumferential groove 99, and the first insert plate portion 941 is configured to be inserted in the first circumferential groove 81 at the spaced section 82 of the snap ring 8 inserted in the first circumferential groove 81.

In the embodiment illustrated in the drawings, in particular, as illustrated in FIG. 4C, FIG. 5C, and FIG. 6C, the length of the first insert plate portion 941 in the circumferential direction is shorter than the distance between one end portion 8a and the other end portion 8b of the snap ring 8. The length of the second insert plate portion 942 in the circumferential direction is not particularly limited, but is substantially the same length as the length of the circumferential direction of the first insert plate portion 941 in the embodiment illustrated in the drawings. The second circumferential groove 99 is formed in the circumferential direction over at least a length equal to or longer than the length of the second insert plate portion 942 in the circumferential direction. The first insert plate portion 941 is inserted in a part of the first circumferential groove 81 in which the snap ring 8 is not inserted (a gap 82 of the snap ring 8). The second insert plate portion 942 is inserted in the second circumferential groove 99.

According to the embodiment as above, the part of the bearing housing 106 to be processed can be kept at a minimum by effectively utilizing the first circumferential groove 81 formed for inserting the snap ring 8 therein. The diffuser component 9 can be reliably fixed in the bearing housing 106 by inserting the second insert plate portion 942 in the second circumferential groove 99 in addition to inserting the first insert plate portion 941 in the first circumferential groove 81.

In several embodiments, as illustrated in FIG. 4A, FIG. 4B, FIG. 4C, FIG. 5A, FIG. 5B, FIG. 5C, FIG. 6A, FIG. 6B, and FIG. 6C, the first insert plate portion 941 and the second insert plate portion 942 are formed at positions opposed to each other in the circumferential direction.

According to the embodiment as above, the first insert plate portion 941 and the second insert plate portion 942 are formed at positions opposed to each other in the circumferential direction. As a result, the diffuser component 9 can be more reliably fixed to the inside of the bearing housing 106 because the diffuser component 9 can be supported by two places opposed to each other in the circumferential direction.

Figure 5A:
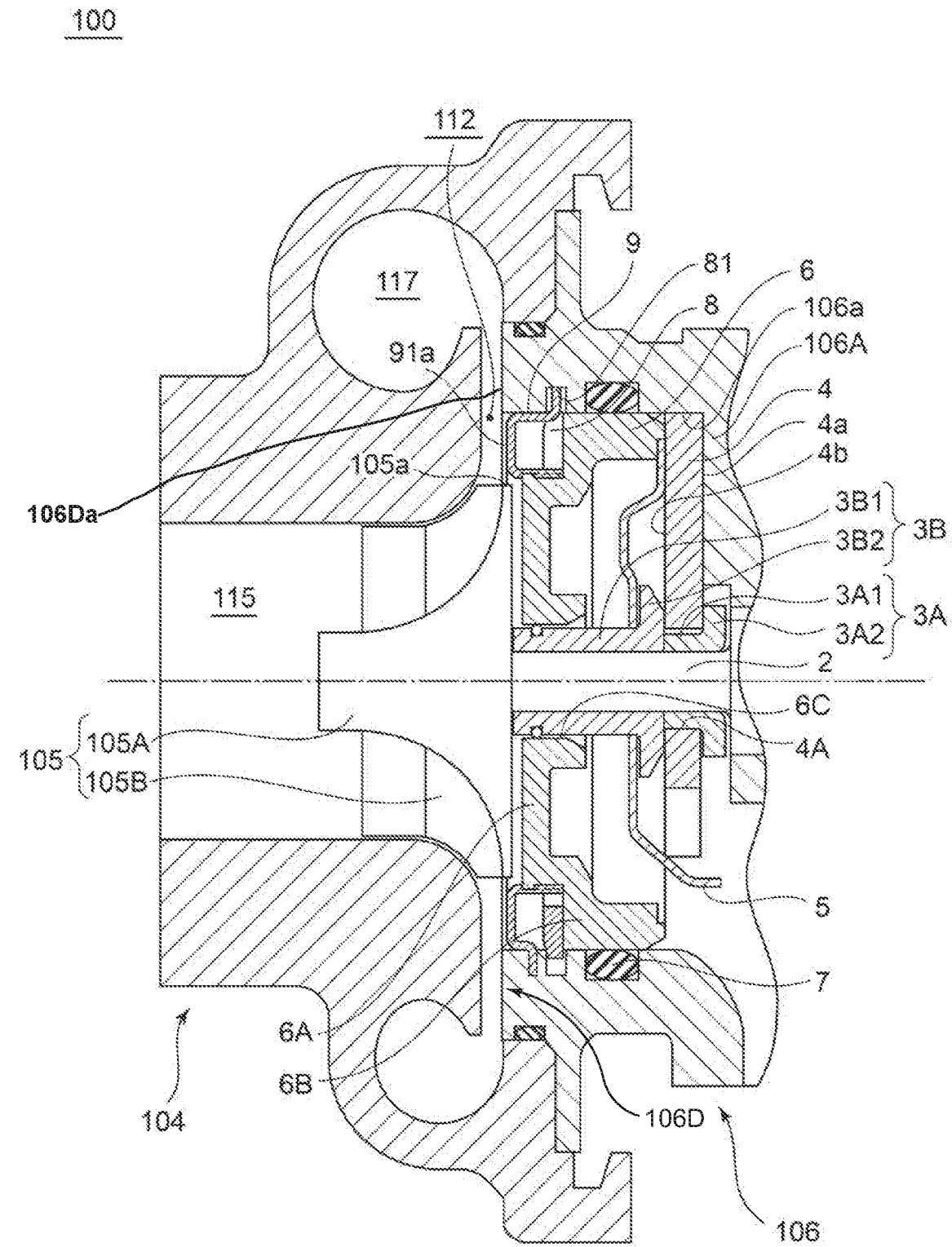
FIG. 5A is a sectional view of the main part of a turbocharger according to one embodiment of this invention.
Figure 5B:
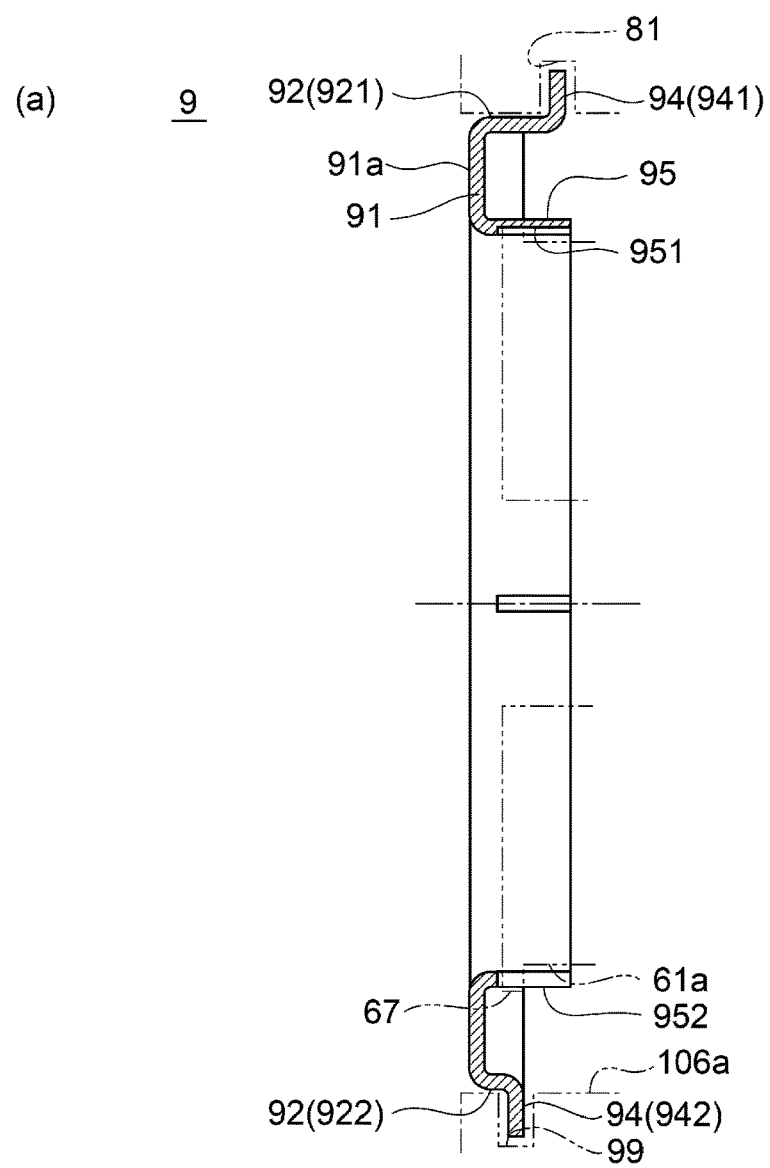
FIG. 5B is a view illustrating a diffuser component in the turbocharger illustrated in FIG. 5A in which (a) is a sectional side view of the diffuser component and (b) is a perspective view of the diffuser component.
Figure 5B:
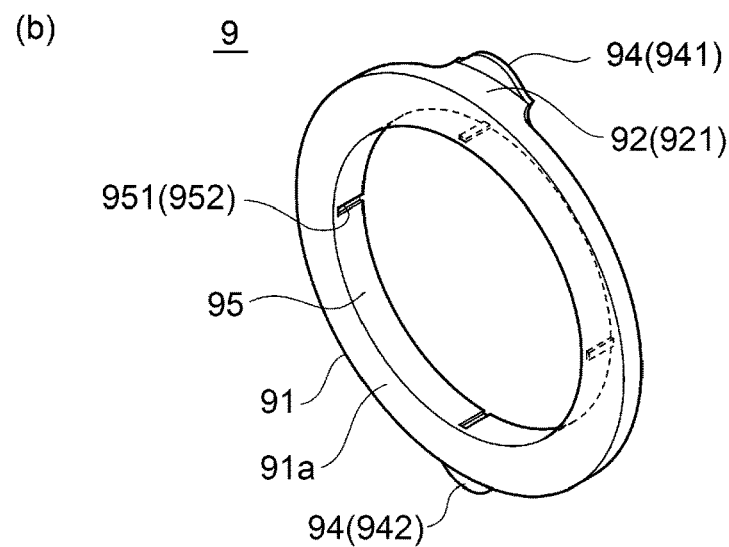
Figure 5C:
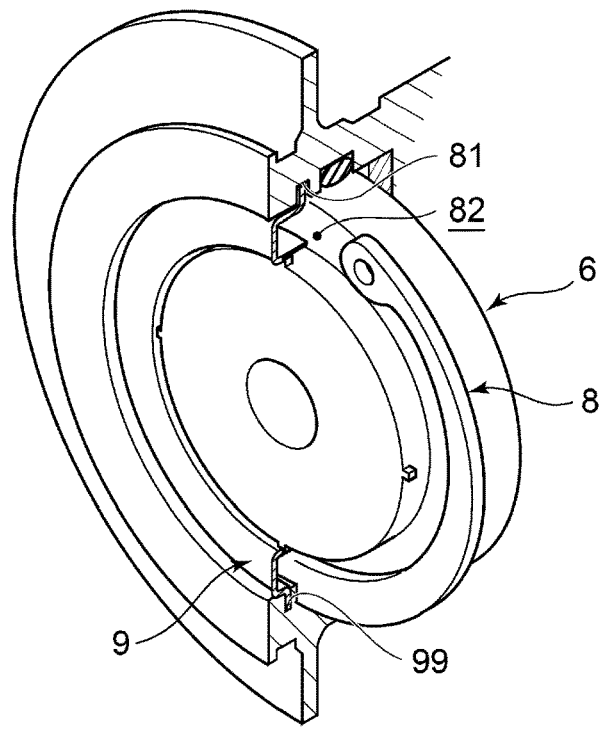
FIG. 5C is a view for describing the assembling state of an insert component, a snap ring, and the diffuser component in the turbocharger illustrated in FIG. 5A.
Figure 5C:
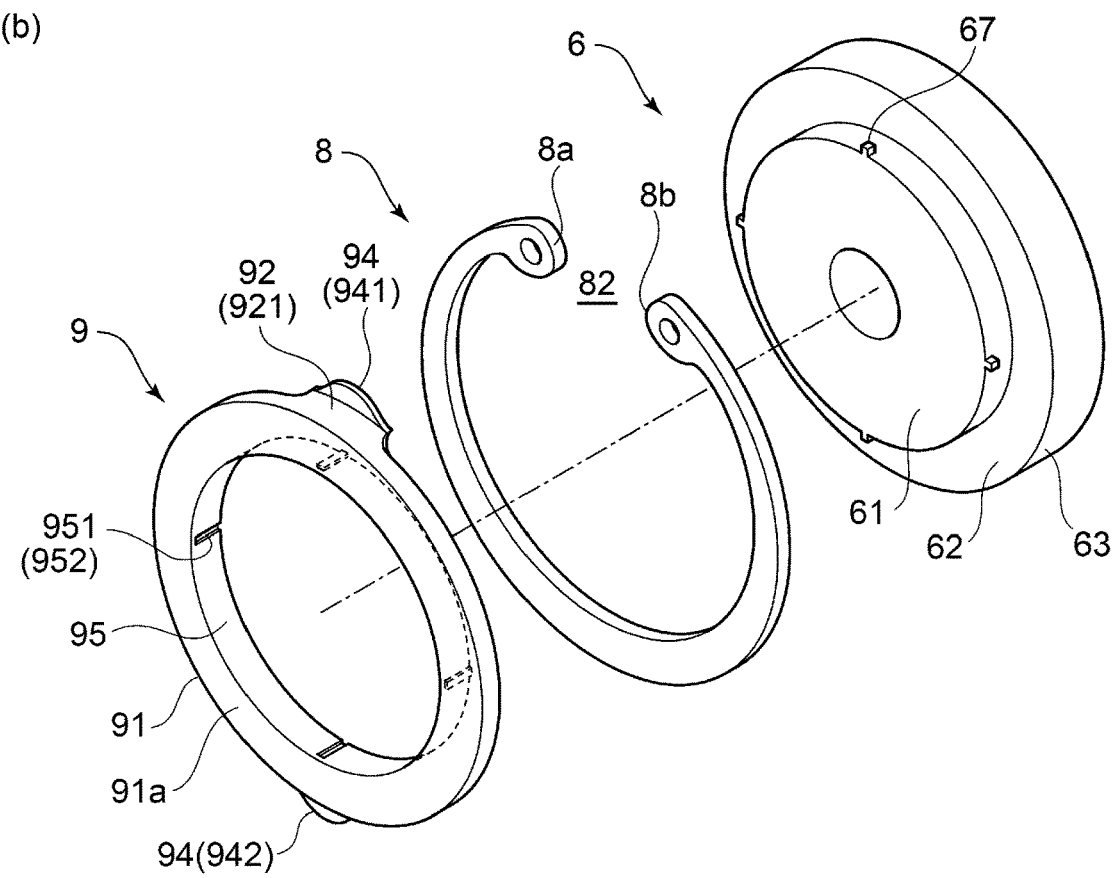
Figure 6A:
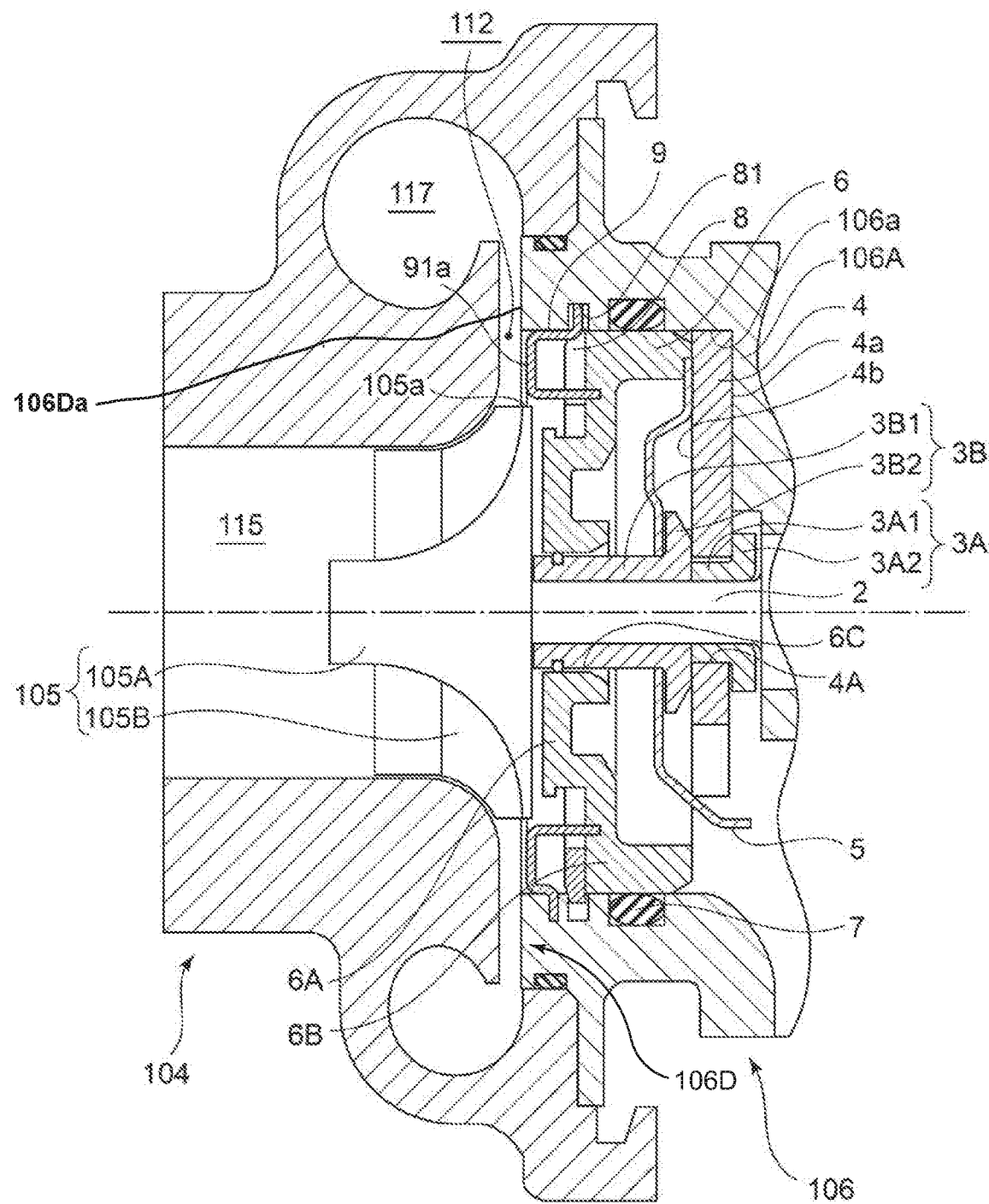
FIG. 6A is a sectional view of the main part of a turbocharger according to one embodiment of this invention.
Figure 6B:
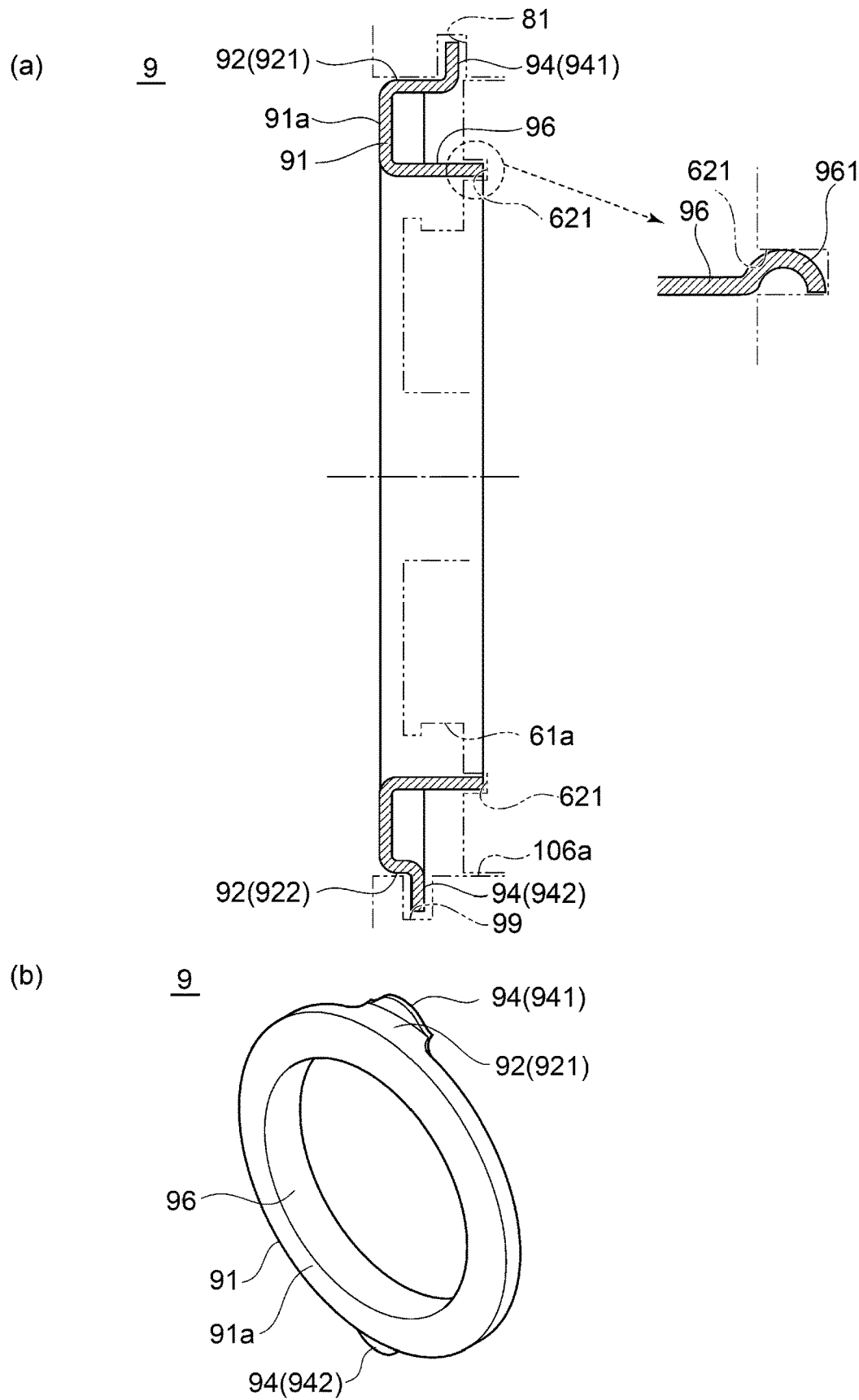
FIG. 6B is a view illustrating a diffuser component in the turbocharger illustrated in FIG. 6A in which (a) is a sectional side view of the diffuser component and (b) is a perspective view of the diffuser component.
Figure 6C:
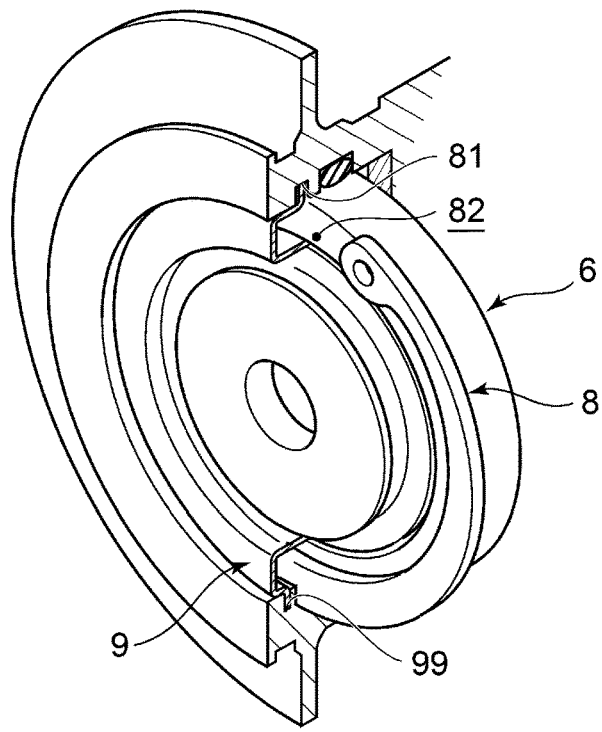
FIG. 6C is a view for describing the assembling state of an insert component, a snap ring, and the diffuser component in the turbocharger illustrated in FIG. 6A.
Figure 6C:
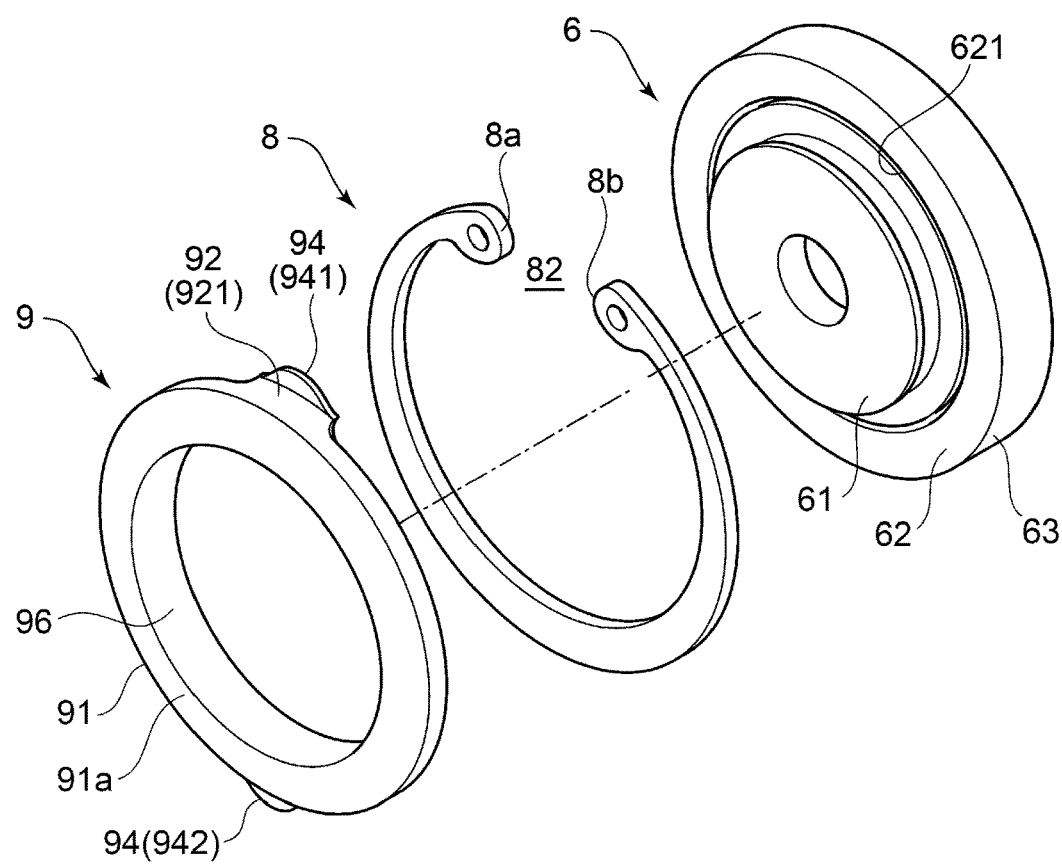
Figure 7A:
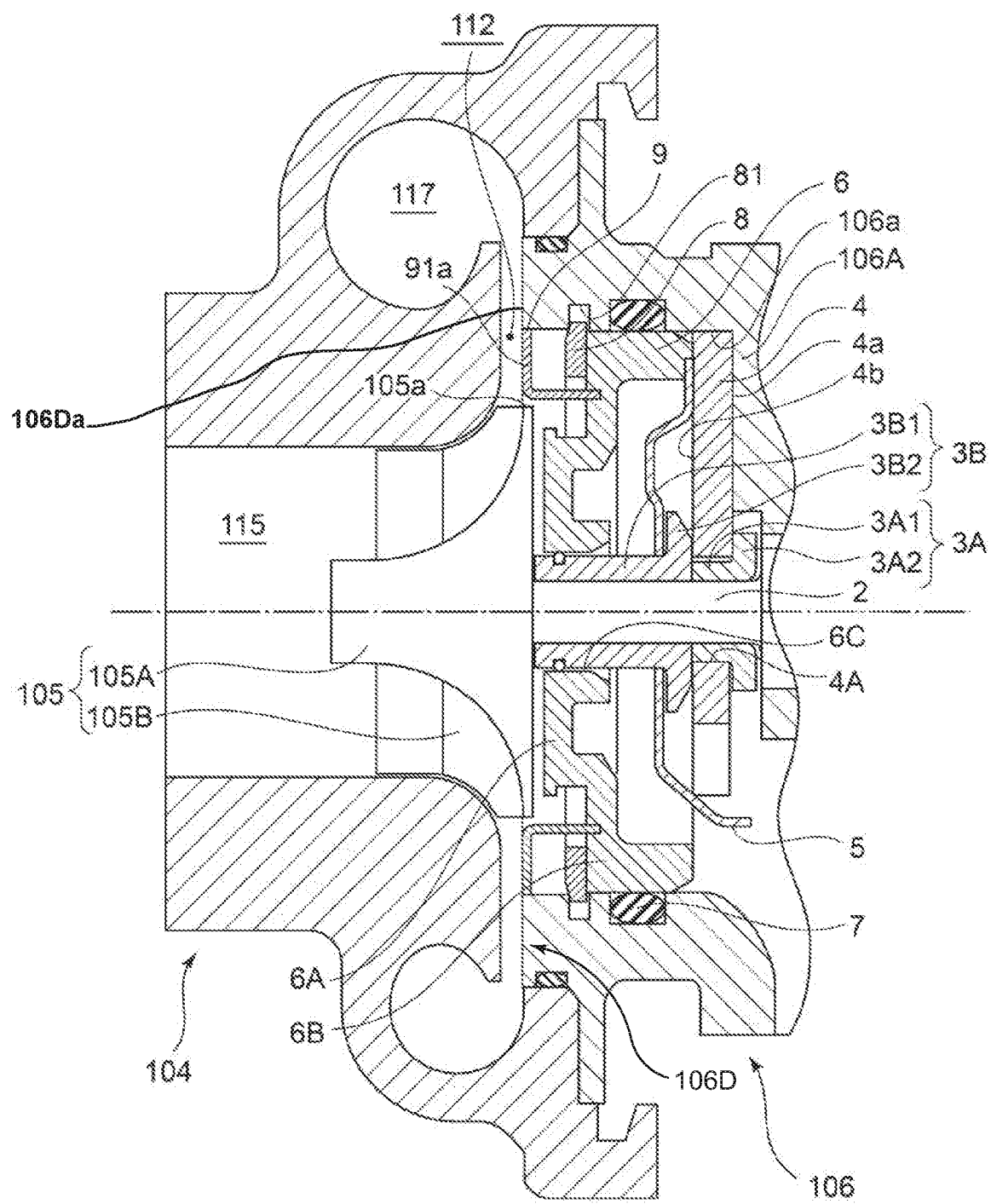
FIG. 7A is a sectional view of the main part of the turbocharger according to one embodiment of this invention.
Figure 7B:
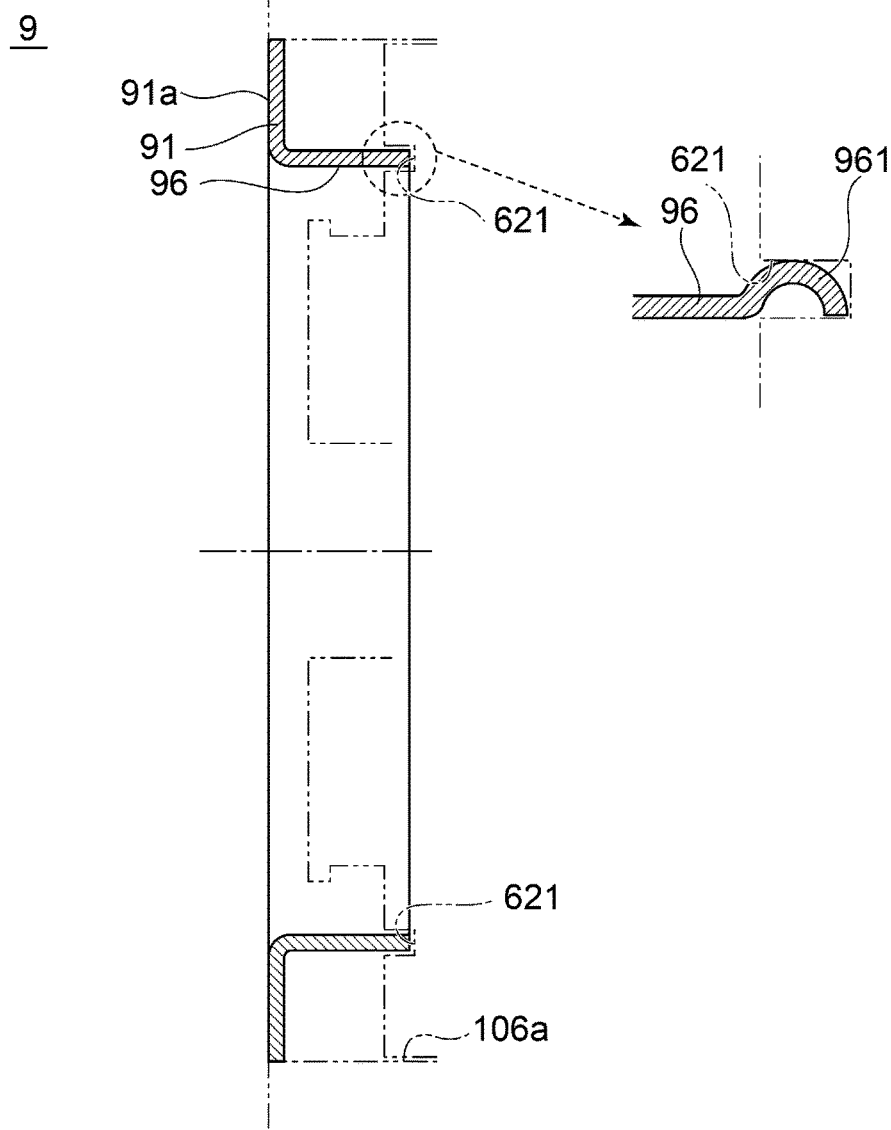
FIG. 7B is a view illustrating a diffuser component in the turbocharger illustrated in FIG. 7A in which (a) is a sectional side view of the diffuser component and (b) is a perspective view of the diffuser component.
Figure 7B:
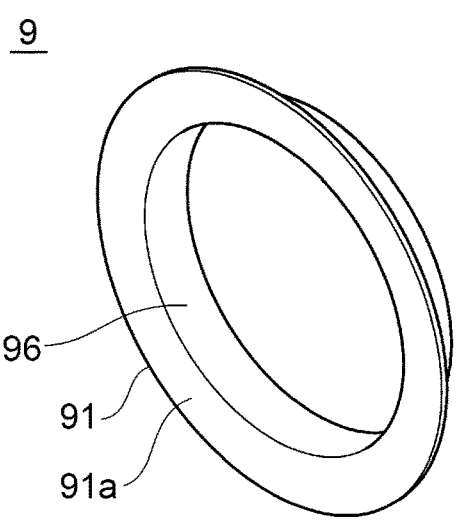

In several embodiments, as illustrated in FIG. 5A, FIG. 5B, and FIG. 5C, the diffuser component 9 includes a plate-shaped cylindrical plate portion 95 extending from the inner peripheral end portion of the diffuser portion 91 toward the insert component 6 along the axial direction of the rotation shaft 2. The insert component 6 has a projecting portion 67 protruding from the outer peripheral end surface 61a of the inner peripheral portion 6A to the outer peripheral side, and at least one projecting portion 67 is formed in the circumferential direction or the projecting portion 67 is formed in plurality at intervals in the circumferential direction. A recessed portion 951 or a slit 952 in which the projecting portion 67 is inserted when the cylindrical plate portion 95 is fitted with the outer peripheral end surface 61a of the inner peripheral portion 6A of the insert component 6 is formed in an inner peripheral surface 95a of the cylindrical plate portion 95 along the axial direction of the rotation shaft 2.

In the embodiment illustrated in the drawings, the radially inner portion of the diffuser component 9, specifically, the radially inner portion of the cylindrical plate portion 95 in a state before the diffuser component 9 is fitted with the outer peripheral end surface 61a of the inner peripheral portion 6A of the insert component 6 is formed to be slightly smaller than the radially outer portion of the outer peripheral end surface 61a of the inner peripheral portion 6A of the insert component 6. The radially outer portion of the outer peripheral end surface 61a of the inner peripheral portion 6A of the insert component 6 is formed to be larger than the radially outer portion of the compressor impeller 105. The diffuser component 9 is inserted in the bearing housing 106 from the opening in the end portion 106D of the bearing housing 106 on one side thereof, and the cylindrical plate portion 95 of the diffuser component 9 is fitted with the outer peripheral end surface 61a of the inner peripheral portion 6A of the insert component 6, to thereby fix the diffuser component 9 to the inside of the bearing housing 106.

According to the embodiment as above, the cylindrical plate portion 95 of the diffuser component 9 is fitted with the outer peripheral end surface 61a of the inner peripheral portion 6A of the insert component 6 in addition to inserting the first insert plate portion 941 in the first circumferential groove 81 and inserting the second insert plate portion 942 in the second circumferential groove 99. As a result, the diffuser component 9 can be more reliably fixed to the inside of the bearing housing 106.

The recessed portion 951 or the slit 952 in which the projecting portion 67 is inserted when the cylindrical plate portion 95 is fitted with the outer peripheral end surface 61a of the inner peripheral portion 6A of the insert component 6 is formed in the inner peripheral surface 95a of the cylindrical plate portion 95 along the axial direction of the rotation shaft 2. As a result, the diffuser component 9 can be easily positioned in the circumferential direction by inserting the diffuser component 9 in the bearing housing 106 along the axial direction of the rotation shaft 2 so that the projecting portion 67 is inserted in the recessed portion 951 or the slit 952. In (a) of FIG. 5B, the upper part of the view illustrates a state in which the projecting portion 67 is inserted in the recessed portion 951 formed in the inner peripheral surface 95a of the cylindrical plate portion 95, and the lower part of the view illustrates a state in which the projecting portion 67 is inserted in the slit 952 formed in the inner peripheral surface 95a of the cylindrical plate portion 95.

In several embodiments, as illustrated in FIG. 6A, FIG. 6B, FIG. 6C, FIG. 7A, and FIG. 7B, the diffuser component 9 includes a plate-shaped horizontal plate portion 96 extending from the inner peripheral end portion of the diffuser portion 91 toward the insert component 6 along the axial direction of the rotation shaft 2. A bulged portion 961 bulging more than other portions of the horizontal plate portion 96 is formed on the distal end of the horizontal plate portion 96. As illustrated in the upper part of FIG. 10, a fitting groove 621 with which the distal end of the horizontal plate portion 96 can be fitted is formed in the outer peripheral-side wall portion 62 of the insert component 6.

In the embodiment illustrated in the drawings, the horizontal plate portion 96 is formed to be an annular shape continuous in the circumferential direction, but the horizontal plate portion 96 may be formed in only a part of the circumferential direction. The bulged portion 961 is formed by bending the distal end of the horizontal plate portion 96 into a curve. However, the shape and the processing method of the bulged portion 961 are not limited thereto. The bulged portion 961 only needs to have a shape bulging more than other portions of the horizontal plate portion 96 so as to be able to be fitted with the fitting groove 621.

According to the embodiment as above, the diffuser component 9 can be fixed in the bearing housing 106 through a simple structure in which the distal end of the horizontal plate portion 96 of the diffuser component 9 is simply fitted with the fitting groove 621 in the insert component 6.

In several embodiments, as illustrated in FIG. 2A, FIG. 2B, FIG. 3A, FIG. 3B, FIG. 4A, FIG. 4B, FIG. 4C, FIG. 5A, FIG. 5B, FIG. 5C, FIG. 6A, FIG. 6B, FIG. 6C, FIG. 7A, and FIG. 7B, the diffuser component 9 includes a plate-shaped component formed by bending a metallic plate.

According to the embodiment as above, the diffuser component 9 can be formed by a simple method of simply bending a metallic plate. Furthermore, the surface roughness of a metallic plate is higher than that of a casting and the like. As a result, according to the embodiment as above, the pressure loss in the diffuser flow path 112 can be reduced because the diffuser portion 91 defining the diffuser flow path 112 is made of a metallic plate.

Figure 8A:
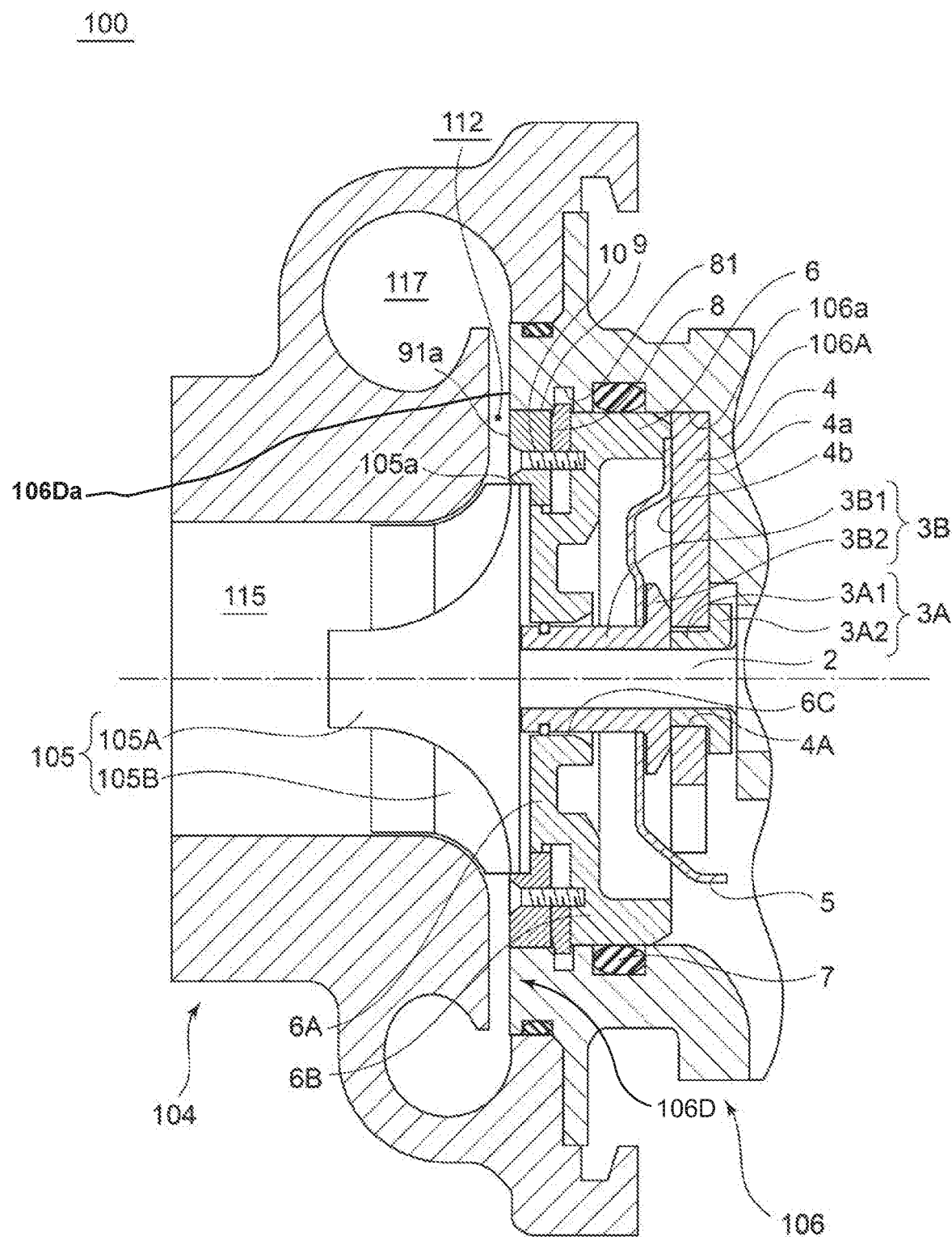
FIG. 8A is a sectional view of the main part of a turbocharger according to one embodiment of this invention.
Figure 8B:
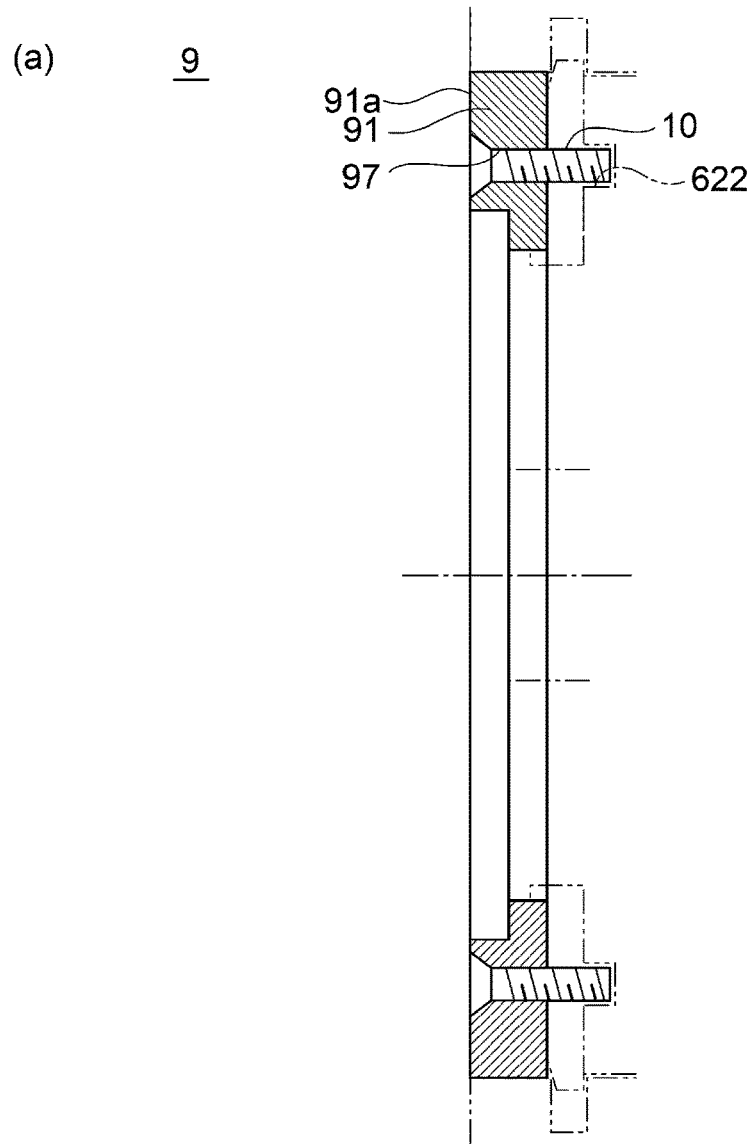
FIG. 8B is a view illustrating a diffuser component in the turbocharger illustrated in FIG. 8A in which (a) is a sectional side view of the diffuser component and (b) is a perspective view of the diffuser component.
Figure 8B:
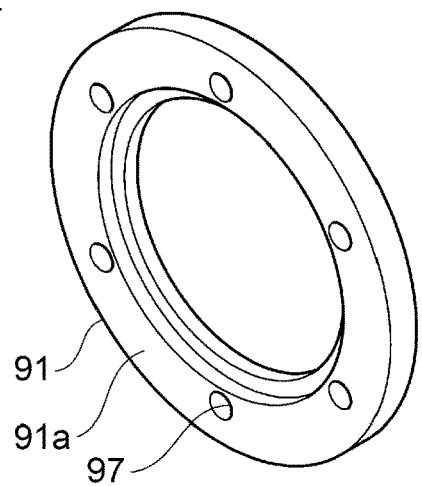

In several embodiments, as illustrated in FIG. 8A and FIG. 8B, a screw hole 97 with which a screw component 10 can be threadedly engaged is formed in the diffuser portion 91 of the diffuser component 9. As illustrated in the lower part of FIG. 10, a screw hole 622 with which the screw component 10 can be threadedly engaged is formed in the outer peripheral-side wall portion 62 of the insert component 6. The diffuser component 9 is configured to be fastened with the insert component 6 by threadedly engaging the screw component 10 with the screw hole 97 in the diffuser component 9 and the screw hole 622 in the insert component 6 from the diffuser surface 91a of the diffuser component 9.

In the embodiment illustrated in the drawings, the diffuser portion 91 of the diffuser component 9 has a thickness needed for the formation of the screw hole 97. For example, the diffuser component 9 as above is made of cast metal or heat-resistant resin.

According to the embodiment as above, the diffuser component 9 can be fixed in the bearing housing 106 through a simple structure in which the diffuser component 9 is simply threadedly engaged with the insert component 6 by the screw component 10.

Figure 9A:
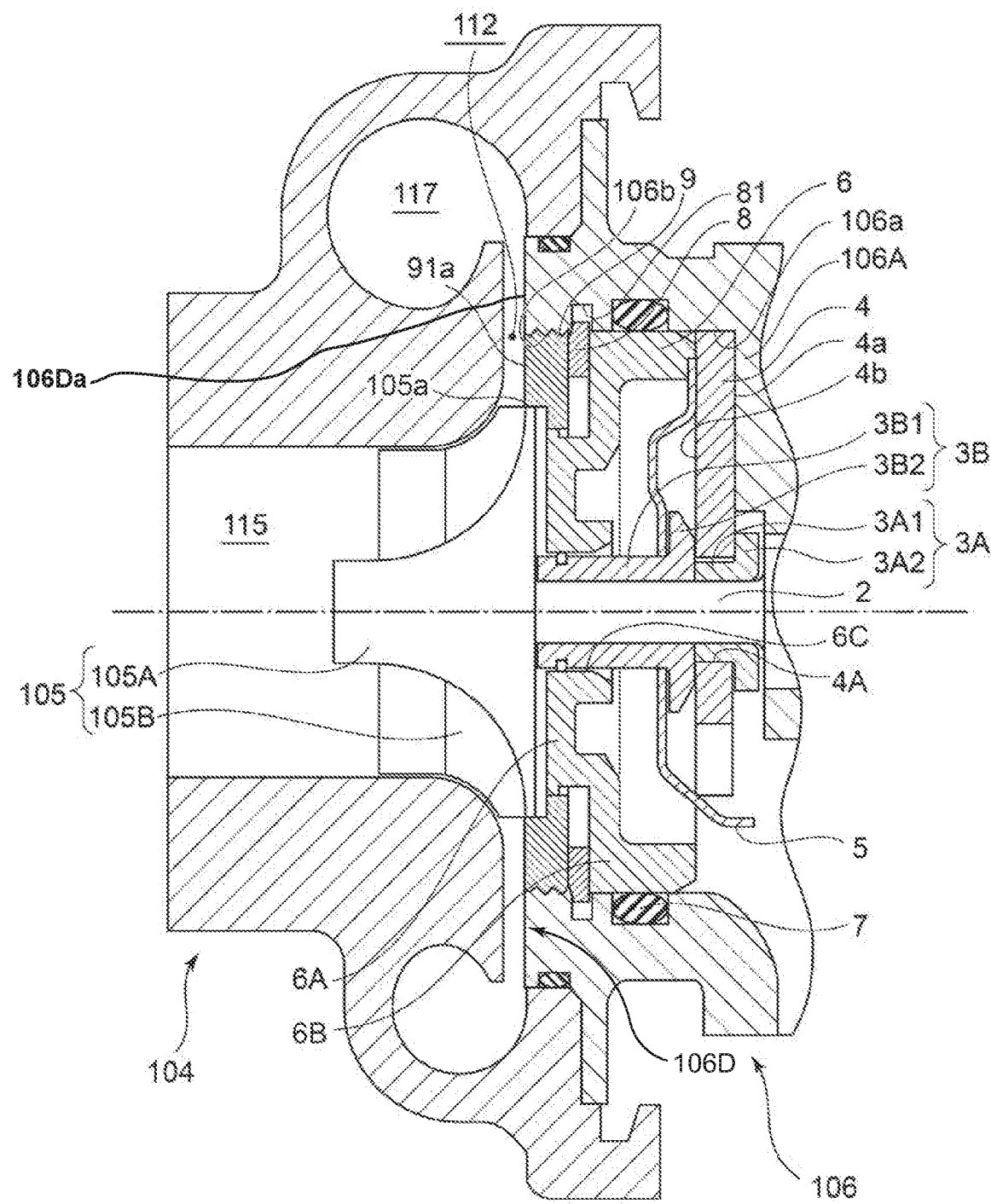
FIG. 9A is a sectional view of the main part a turbocharger according to one embodiment of this invention.
Figure 9B:
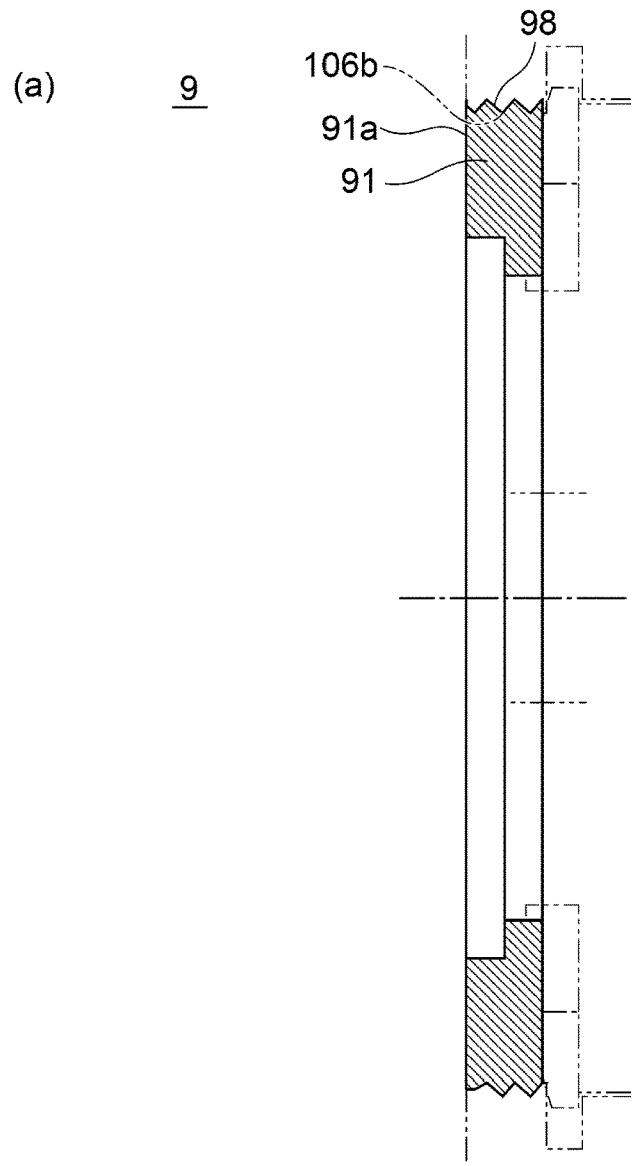
FIG. 9B is a view illustrating a diffuser component in the turbocharger illustrated in FIG. 9A in which (a) is a sectional side view of the diffuser component and (b) is a perspective view of the diffuser component.
Figure 9B:
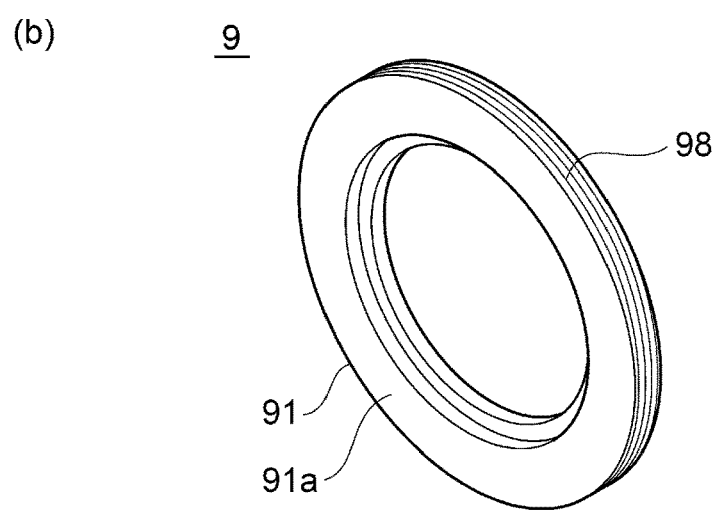

In several embodiments, as illustrated in FIG. 9A and FIG. 9B, a screw groove 106b having a predetermined length is formed in the inner peripheral wall surface 106a of the bearing housing 106 from the end portion 106D of the bearing housing 106 on one side thereof along the axial direction of the rotation shaft 2. The diffuser component 9 is formed into an annular shape, and a screw thread 98 that can threadedly engage with the screw groove 106b is formed in the outer peripheral surface of the diffuser component 9.

According to the embodiment as above, the diffuser component 9 can be fixed in the bearing housing 106 through a simple structure in which the outer peripheral surface of the diffuser component 9 and the inner peripheral wall surface 106a of the bearing housing 106 are simply threadedly engaged with each other.

While preferred embodiments of this invention have been described, this invention is not limited to the embodiments described above. For example, the embodiments described above may be combined and various changes can be made without departing from the object of this invention.

For example, in the embodiments described above, an example in which the turbocharger 100 is a turbocharger is described, but the turbocharger of this invention is not limited thereto. The turbocharger of this invention may be, for example, an electric compressor in which a rotation shaft rotates by a motor, or a mechanical supercharger in which a rotation shaft rotates by power transmitted from a crankshaft or the like.

REFERENCE SIGNS LIST

2 Rotation shaft
3A First thrust collar
3A1 Collar main body portion
3A2 Radially large portion
3B Second thrust collar
3B1 Collar main body portion
3B2 Large-diameter portion
4 Thrust plate
4A Insertion hole
4a One surface
4b Other surface
5 Oil deflector
6 Insert component
6A Inner peripheral portion
6B Outer peripheral portion
6C Insert portion
61 Inner peripheral-side wall portion
61a Outer peripheral end surface
62 Outer peripheral-side wall portion
621 Fitting groove
622 Screw hole
63 Protruding portion
63a Outer peripheral surface
63b Step portion
64 Extension portion
65 Connection portion
66 Projecting portion
66a Outer peripheral end
67 Projecting portion
7 Seal component
8 Snap ring
8a One end portion
8b Other end portion
81 First circumferential groove
82 Spaced section
9 Diffuser component
91 Diffuser portion
91a Diffuser surface
92 Outer peripheral-side plate portion
921 First outer peripheral-side plate portion
922 Second outer peripheral-side plate portion
93 Inner peripheral-side plate portion
931 Horizontal portion
932 Vertical portion
93a Inner peripheral end
94 Insert plate portion
941 First insert plate portion
942 Second insert plate portion
95 Cylindrical plate portion
951 Recessed portion
952 Slit
95a Inner peripheral surface
96 Horizontal plate portion
961 Bulged portion
97 Screw hole
98 Screw thread
99 Second circumferential groove
10 Screw component
100 Turbocharger
102 Turbine housing
103 Turbine impeller
103A Turbine hub
103B Turbine blade
104 Compressor housing
105 Compressor impeller
105A Compressor hub
105B Compressor blade
105a Outer peripheral edge
106 Bearing housing
106A Protruding wall portion
106a Inner peripheral wall surface
106b Screw groove
110 Radial bearing
111 Exhaust gas discharging flow path
112 Diffuser flow path
113 Turbine scroll flow path
115 Intake air introducing flow path
116 Nut
117 Compressor scroll flow path
118 Lubricant oil introducing path
119 Lubricant oil outlet

The invention claimed is:

1. A turbocharger, comprising:
a rotation shaft;
a compressor impeller provided on one end side of the rotation shaft;
a compressor housing configured to accommodate the compressor impeller;
a bearing housing connected to the compressor housing at an end portion of the bearing housing on one side thereof, the bearing housing being configured to define, between the bearing housing and the compressor housing, a diffuser flow path which extends along a direction orthogonal to an axis of the rotation shaft and through which intake air compressed by the compressor impeller flows, the bearing housing comprising therein a protruding wall portion protruding from an inner peripheral wall surface of the bearing housing;
a thrust plate accommodated in the bearing housing and configured to support the rotation shaft in an axial direction;
an insert component accommodated in the bearing housing at a position closer to the end portion of the bearing housing on one side thereof than a position of the thrust plate in the axial direction of the rotation shaft, and configured to retain the thrust plate between the insert component and the protruding wall portion;
a snap ring accommodated in the bearing housing and configured to be inserted in a first circumferential groove formed in the inner peripheral wall surface of the bearing housing, to thereby fix the insert component in a state in which the insert component is pressed against the thrust plate; and a diffuser component accommodated in the bearing housing and having a diffuser surface that defines a part of the diffuser flow path extending along the direction orthogonal to the axis of the rotation shaft between the inner peripheral wall surface of the end portion of the bearing housing on one side thereof and an outer peripheral edge of the compressor impeller, wherein a radially outer portion of the compressor impeller is formed to be smaller than a radially inner portion of the end portion of the bearing housing on one side thereof, wherein the diffuser surface is positioned closer to a wall surface side of the compressor housing defining the diffuser flow path than a back surface of the compressor impeller in the axial direction of the rotation shaft, and wherein the diffuser surface is positioned at the same position as an end surface of the end portion of the bearing housing on one side thereof or farther away from the wall surface side of the compressor housing than an end surface of the end portion of the bearing housing on one side thereof in the axial direction of the ration shaft.

2. The turbocharger according to claim 1,
wherein the insert component comprises:
   an inner peripheral portion comprising an inner peripheral-side wall portion extending along the direction orthogonal to the axis of the rotation shaft; and
   an outer peripheral portion comprising:
      an outer peripheral-side wall portion extending along the direction orthogonal to the axis of the rotation shaft at a position farther from the end portion of the bearing housing on one side thereof than a position of the inner peripheral-side wall portion; and
      a protruding portion protruding from the outer peripheral-side wall portion toward the thrust plate,
wherein the snap ring is configured to be positioned on an outer peripheral side of the inner peripheral portion of the insert component and come into abutment with the outer peripheral-side wall portion of the insert component in a state in which the snap ring is inserted in the first circumferential groove, and
wherein the diffuser component is configured to be positioned on ieaouter peripheral side of the inner peripheral portion of the insert component.

3. The turbocharger according to claim 2,
wherein the diffuser component comprises:
   a plate-shaped diffuser portion having the diffuser surface; and
   a plate-shaped outer peripheral-side plate portion extending along the axial direction of the rotation shaft from an outer peripheral end portion of the plate-shaped diffuser portion, and
wherein the plate-shaped outer peripheral-side plate portion is configured to come into abutment with the inner peripheral wall surface of the bearing housing along the axial direction of the rotation shaft.

4. The turbocharger according to claim 3,
wherein the insert component comprises a projecting portion protruding from an outer peripheral end surface of the inner peripheral portion to the outer peripheral side,
wherein the diffuser component comprises a plate-shaped inner peripheral-side plate portion extending from an inner peripheral end portion of the plate-shaped diffuser portion toward the inner peripheral portion of the insert component, and wherein in a state in which the insert component and the diffuser component are accommodated in the bearing housing, an inner peripheral end of the plate-shaped inner peripheral-side plate portion is configured to be positioned farther from the end portion of the bearing housing on one side thereof than the projecting portion in the axial direction of the rotation shaft, and positioned closer to the rotation shaft than an outer peripheral end of the projecting portion is in the direction orthogonal to the axis of the rotation shaft.

5. The turbocharger according to claim 3,
wherein a radially outer portion of the plate-shaped outer peripheral-side plate portion of the diffuser component is formed to be larger than the radially inner portion of the end portion of the bearing housing on one side thereof, and
wherein the diffuser component is press fitted in the bearing housing to be fixed in the bearing housing.

6. The turbocharger according to claim 3,
wherein the diffuser component comprises a plate-shaped inner peripheral-side plate portion extending from an inner peripheral end portion of the plate-shaped diffuser portion toward the inner peripheral portion of the insert component,
wherein a radially inner portion of the plate-shaped inner peripheral-side plate portion of the diffuser component is formed to be smaller than a radially outer portion of an outer peripheral end surface of the inner peripheral portion of the insert component, and
wherein the diffuser component is fitted with the outer peripheral end surface of the inner peripheral portion of the insert component to be fixed in the bearing housing.

7. The turbocharger according to claim 3,
wherein the inner peripheral wall surface of the bearing housing has a second circumferential groove formed therein at a position closer to the end portion on one side of the bearing housing than a position of the first circumferential groove in the axial direction of the rotation shaft,
wherein the diffuser component comprises a plate-shaped insert plate portion extending from the plate-shaped outer peripheral-side plate portion to an outer peripheral side, and
wherein the plate-shaped insert plate portion is configured to be inserted in the second circumferential groove.

8. The turbocharger according to claim 7,
wherein the second circumferential groove is formed over an entire periphery of the inner peripheral wall surface of the bearing housing, and
wherein the plate-shaped insert plate portion is configured to be inserted in the second circumferential groove over the entire periphery of the inner peripheral wall surface of the bearing housing.

9. The turbocharger according to claim 7,
wherein the first circumferential groove is formed over an entire periphery of the inner peripheral wall surface of the bearing housing,
wherein the snap ring has a spaced section formed by spacing both end portions of an arc shape,
wherein the outer peripheral-side plate portion of the diffuser component comprises:
   a first outer peripheral-side plate portion; and
   a second outer peripheral-side plate portion formed at a position different from the first outer peripheral-side plate portion in a circumferential direction and having an extending length shorter than an extending length of the first outer peripheral-side plate portion, wherein the plate-shaped insert plate portion of the diffuser component comprises:

a first insert plate portion extending from the first outer peripheral-side plate portion to the outer peripheral side; and a second insert plate portion extending from the second outer peripheral-side plate portion to the outer peripheral side, wherein the second insert plate portion is configured to be inserted in the second circumferential groove, and wherein the first insert plate portion is configured to be inserted in the first circumferential groove at the spaced section of the snap ring inserted in the first circumferential groove.

10. The turbocharger according to claim 9, wherein when the diffuser component is viewed from the axial direction of the rotation shaft, the second insert plate portion is formed at a position opposed to the first insert plate portion in the circumferential direction.

11. The turbocharger according to claim 9, wherein the diffuser component comprises a plate-shaped cylindrical plate portion extending from an inner peripheral end portion of the plate-shaped diffuser portion toward the insert component along the axial direction of the rotation shaft, wherein the insert component comprises a singular projecting portion protruding from an outer peripheral end surface of the inner peripheral portion of the outer peripheral side or a plurality of projecting portions formed at intervals in the circumferential direction, wherein the plate shape cylindrical portion comprises an inner peripheral surface along the axial direction of the rotation shaft, wherein the inner peripheral surface comprises a singular recessed portion to receive the singular projecting portion or a plurality of recessed portions formed at intervals in the circumferential direction to receive the plurality of projecting portions, and wherein a recessed portion or a slit in which the projecting portion is inserted when the plate-shaped cylindrical plate portion is fitted with the outer peripheral end surface of the inner peripheral portion of the insert component is formed in an inner peripheral surface of the plate-shaped cylindrical plate portion along the axial direction of the rotation shaft.

12. The turbocharger according to claim 3, wherein the diffuser component comprises a plate-shaped horizontal plate portion extending from an inner peripheral end portion of the plate-shaped diffuser portion toward the insert component along the axial direction of the rotation shaft, the plate-shaped horizontal plate portion having a distal end on which a bulged portion bulging more than other portions of the plate-shaped horizontal plate portion is formed, and wherein the outer peripheral-side wall portion of the insert component has a fitting groove formed therein with which the distal end of the plate-shaped horizontal plate portion is fittable.

13. The turbocharger according to claim 3, wherein the diffuser component is formed of a plate-shaped component formed by bending a sheet metal.

14. The turbocharger according to claim 2, wherein a diffuser portion of the diffuser component has a screw hole formed therein with which a screw component is threadedly engageable, wherein the outer peripheral side wall portion of the insert component has a screw hole formed therein with which the screw component is threadedly engageable, and wherein the diffuser component is fastened with the insert component by threadedly engaging the screw component with the screw hole in the diffuser component and the screw hole in the insert component from the diffuser surface of the diffuser component.

15. The turbocharger according to claim 2, wherein the inner peripheral wall surface of the bearing housing has a screw groove having a predetermined length formed therein from the end portion of the bearing housing on one side thereof along the axial direction of the rotation shaft, and wherein the diffuser component is formed to have an annular shape, and a screw thread that is threadedly engageable with the screw groove is formed on an outer peripheral surface of the diffuser component.

16. A turbocharger, comprising:

a rotation shaft;

a compressor impeller provided on one end side of the rotation shaft;

a compressor housing configured to accommodate the compressor impeller;

a bearing housing connected to the compressor housing at an end portion of the bearing housing on one side thereof, the bearing housing being configured to define, between the bearing housing and the compressor housing, a diffuser flow path which extends along a direction orthogonal to an axis of the rotation shaft and through which intake air compressed by the compressor impeller flows, the bearing housing comprising therein a protruding wall portion protruding from an inner peripheral wall surface of the bearing housing;

a thrust plate accommodated in the bearing housing and configured to support the rotation shaft in an axial direction;

an insert component accommodated in the bearing housing at a position closer to the end portion of the bearing housing on one side thereof than a position of the thrust plate in the axial direction of the rotation shaft, and configured to retain the thrust plate between the insert component and the protruding wall portion;

a snap ring accommodated in the bearing housing and configured to be inserted in a first circumferential groove formed in the inner peripheral wall surface of the bearing housing, to thereby fix the insert component in a state in which the insert component is pressed against the thrust plate; and a diffuser component accommodated in the bearing housing and having a diffuser surface that defines a part of the diffuser flow path extending along the direction orthogonal to the axis of the rotation shaft between the inner peripheral wall surface of the end portion of the bearing housing on one side thereof and an outer peripheral edge of the compressor impeller, wherein the insert component comprises:

an inner peripheral portion comprising an inner peripheral-side wall portion extending along the direction orthogonal to the axis of the rotation shaft; and an outer peripheral portion comprising:

an outer peripheral-side wall portion extending along the direction orthogonal to the axis of the rotation shaft at a position farther from the end portion of the bearing housing on one side thereof than a position of the inner peripheral-side wall portion; and a protruding portion protruding from the outer peripheral-side wall portion toward the thrust plate, wherein the snap ring is configured to be positioned on an outer peripheral side of the inner peripheral portion of the insert component and come into abutment with the outer peripheral-side wall portion of the insert component in a state in which the snap ring is inserted in the first circumferential groove, wherein the diffuser component is configured to be positioned on the outer peripheral side of the inner peripheral portion of the insert component, wherein a diffuser portion of the diffuser component has a screw hole formed therein with which a screw component is threadedly engageable, wherein the outer peripheral side wall portion of the insert component has a screw hole formed therein with which the screw component is threadedly engageable, and wherein the diffuser component is fastened with the insert component by threadedly engaging the screw component with the screw hole in the diffuser component and the screw hole in the insert component from the diffuser surface of the diffuser component.

17. A turbocharger, comprising:
a rotation shaft;
a compressor impeller provided on one end side of the rotation shaft;
a compressor housing configured to accommodate the compressor impeller;
a bearing housing connected to the compressor housing at an end portion of the bearing housing on one side thereof, the bearing housing being configured to define, between the bearing housing and the compressor housing, a diffuser flow path which extends along a direction orthogonal to an axis of the rotation shaft and through which intake air compressed by the compressor impeller flows, the bearing housing comprising therein a protruding wall portion protruding from an inner peripheral wall surface of the bearing housing;
a thrust plate accommodated in the bearing housing and configured to support the rotation shaft in an axial direction;
an insert component accommodated in the bearing housing at a position closer to the end portion of the bearing housing on one side thereof than a position of the thrust plate in the axial direction of the rotation shaft, and configured to retain the thrust plate between the insert component and the protruding wall portion;
a snap ring accommodated in the bearing housing and configured to be inserted in a first circumferential groove formed in the inner peripheral wall surface of the bearing housing, to thereby fix the insert component in a state in which the insert component is pressed against the thrust plate; and
a diffuser component accommodated in the bearing housing and having a diffuser surface that defines a part of the diffuser flow path extending along the direction orthogonal to the axis of the rotation shaft between the inner peripheral wall surface of the end portion of the bearing housing on one side thereof and an outer peripheral edge of the compressor impeller, wherein the insert component comprises:
an inner peripheral portion comprising an inner peripheral-side wall portion extending along the direction orthogonal to the axis of the rotation shaft; and
an outer peripheral portion comprising:
an outer peripheral-side wall portion extending along the direction orthogonal to the axis of the rotation shaft at a position farther from the end portion of the bearing housing on one side thereof than a position of the inner peripheral-side wall portion; and
a protruding portion protruding from the outer peripheral-side wall portion toward the thrust plate, wherein the snap ring is configured to be positioned on an outer peripheral side of the inner peripheral portion of the insert component and come into abutment with the outer peripheral-side wall portion of the insert component in a state in which the snap ring is inserted in the first circumferential groove, wherein the diffuser component is configured to be positioned on the outer peripheral side of the inner peripheral portion of the insert component, wherein the inner peripheral wall surface of the bearing housing has a screw groove having a predetermined length formed therein from the end portion of the bearing housing on one side thereof along the axial direction of the rotation shaft, and wherein the diffuser component is formed to have an annular shape, and a screw thread that is threadedly engageable with the screw groove is formed on an outer peripheral surface of the diffuser component.

* * * * *